(12) United States Patent
Wang et al.

(10) Patent No.: US 10,050,336 B2
(45) Date of Patent: Aug. 14, 2018

(54) INTEGRATED DIGITAL ACTIVE PHASED ARRAY ANTENNA AND WINGTIP COLLISION AVOIDANCE SYSTEM

(71) Applicant: Honeywell International Inc., Morris Plains, NJ (US)

(72) Inventors: Nigel Wang, Shanghai (CN); David C. Vacanti, Renton, WA (US)

(73) Assignee: Honeywell International Inc., Morris Plains, NJ (US)

( * ) Notice: Subject to any disclaimer, the term of this patent is extended or adjusted under 35 U.S.C. 154(b) by 58 days.

(21) Appl. No.: 15/253,494

(22) Filed: Aug. 31, 2016

(65) Prior Publication Data

US 2017/0346169 A1 Nov. 30, 2017

Related U.S. Application Data

(60) Provisional application No. 62/343,704, filed on May 31, 2016.

(51) Int. Cl.
| | |
|---|---|
| *H01Q 1/28* | (2006.01) |
| *H01Q 13/10* | (2006.01) |
| *G08G 5/04* | (2006.01) |
| *H01Q 13/22* | (2006.01) |
| *H01Q 13/18* | (2006.01) |
| *H01Q 21/00* | (2006.01) |

(52) U.S. Cl.
CPC ............... *H01Q 1/28* (2013.01); *G08G 5/04* (2013.01); *H01Q 13/10* (2013.01); *H01Q 13/18* (2013.01); *H01Q 13/22* (2013.01); *H01Q 21/00* (2013.01)

(58) Field of Classification Search
CPC .......... H01Q 1/28; H01Q 13/10; H01Q 13/18; H01Q 13/22; H01Q 21/00
See application file for complete search history.

(56) References Cited

U.S. PATENT DOCUMENTS

| | | |
|---|---|---|
| 5,132,693 A | 7/1992 | Werp |
| 7,808,439 B2 | 10/2010 | Yang et al. |
| 7,973,616 B2 | 7/2011 | Shijio et al. |

(Continued)

FOREIGN PATENT DOCUMENTS

| | | |
|---|---|---|
| CN | 201238075 Y | 5/2009 |
| CN | 103887584 A | 6/2014 |

(Continued)

OTHER PUBLICATIONS

Yamamoto et al., "A Post-Wall Waveguide Slot Array with a Three-Way Divider on a Single-Layer Dielectric Substrate," the Institute of Electronics, Information and Communication Engineers, vol. 88-B, No. 4, Apr. 2005, 3 pp.

(Continued)

*Primary Examiner* — Hoang Nguyen

(74) *Attorney, Agent, or Firm* — Shumaker & Sieffert, P.A.

(57) ABSTRACT

An integrated slot waveguide antenna array for a radar system. The antenna array may include substrate integrated waveguide (SIW) elements, transmit, receive and processing electronics in a lightweight, low-cost, highly integrated package. The combination of antenna layout, specific dimensions of SIW features, including vias, terminal edges and slot placement may allow an efficient transmit and receive radar pattern as well as consistent, reliable and low cost manufacturing.

5 Claims, 18 Drawing Sheets

(56) References Cited

U.S. PATENT DOCUMENTS

| | | | |
|---|---|---|---|
| 8,368,583 | B1 | 2/2013 | Piesinger |
| 8,570,211 | B1 | 10/2013 | Piesinger |
| 8,648,676 | B2 | 2/2014 | Abhari et al. |
| 8,665,142 | B2 | 3/2014 | Shijo et al. |
| 9,035,838 | B2 | 5/2015 | Le Bars et al. |
| 9,246,228 | B2 | 1/2016 | Lee et al. |
| 2008/0150821 | A1* | 6/2008 | Koch ............... H01Q 21/0075 343/776 |
| 2009/0066597 | A1 | 3/2009 | Yang et al. |
| 2009/0164122 | A1 | 6/2009 | Morbey et al. |
| 2012/0056776 | A1 | 3/2012 | Shijo et al. |
| 2013/0321227 | A1 | 12/2013 | Ratajczak |
| 2014/0184456 | A1 | 1/2014 | Lee et al. |
| 2014/0142838 | A1 | 5/2014 | Durand |
| 2014/0240186 | A1* | 8/2014 | Zhou ..................... H01Q 13/06 343/772 |
| 2016/0036110 | A1 | 2/2016 | Cheng et al. |
| 2016/0126637 | A1 | 5/2016 | Uemichi |

FOREIGN PATENT DOCUMENTS

| | | |
|---|---|---|
| CN | 103022707 B | 10/2014 |
| CN | 103022708 B | 6/2015 |

OTHER PUBLICATIONS

Partial European Search Report from counterpart European Application No. 17173844.6, dated Oct. 16, 2017, 15 pp.

Extended Search Report from counterpart European Application No. 17173844.6, dated Jan. 22, 2018, 12 pp.

"7 Series FPGAs Overview," DS180, XILINX, Inc., retrieved from http://www.xilinx.com/support/documentation/data_sheets/ds180_7Series_Overview.pdf on May 23, 2016, 17 pp.

Wu, "Substrate Integrated Waveguide Antenna Applications," School of Engineering and Digital Arts, University of Kent, Aug. 2015, last modified Feb. 5, 2016, 8 pages.

"RO3000 High Frequency Laminates," Rogers Corporation, retrieved from https://www.rogerscorp.com/documents/722/acs/RO3000-Laminate-Data-Sheet-RO3003-RO3006-RO3010-RO3035.pdf, May 23, 2016, 4 pp.

"Fractional N Frequency Synthesizer Tutorial," Fractional N Synthesizer, Radio Electronics, retrieved from http://www.radioelectronics.com/info/rftechnologydesign/pllsynthesizers/fractionalnsynthesis.php, May 22, 2016, 9 pp.

Rhbanou et al., "Design of Substrate Integerated Waveguide Bandpass Filter Based on Metamaterials CSRRs," Electrical and Electronic Engineering, 2014, 10 pp. (Applicant points out, in accordance with MPEP 609.04(a), that the year of publication, 2010, is sufficiently earlier than the effective U.S. filing date, 2016, so that the particular month of publication is not in issue.).

Rowan et al., "Mixers and frequency multipliers," Chapter 7, Practical Rf Circuit Design for Modern Wireless Systems, vol. II Active Circuits and Systems, Dec. 31, 2002, 10 pp.

Marki et al., "Mixer Basics Primer: A tutorial for RF & Microwave Mixers," Marki Microwave, 2010, 12 pp. (Applicant points out, in accordance with MPEP 609.04(a), that the year of publication, 2014, is sufficiently earlier than the effective U.S. filing date, 2016, so that the particular month of publication is not in issue.).

"Kintex-7 FPGAs Data Sheet: DC and AC Switching Characteristics," XILINX, Inc., retrieved from http://www.xilinx.com/support/documentation/data_sheets/ds182_Kintex_7_Data_Sheet.pdf on May 23, 2016, 69 pp.

"Radar Basics—In-phase & Quadrature Procedure," retrieved from http://Radartutorial.eu/10.processing/sp06.en.html on May 9, 2016, 1 pp.

"RO4000 Series High Frequency Circuit Materials," Data Sheet, Rogers Corporation, retrieved from https://www.rogerscorp.com/documents/726/acs/RO4000-LaminatesData-sheet.pdf, May 23, 2016, 4 pp.

"RO4350B Laminates," Rogers Corporation, retrieved from https://www.rogerscorp.com/acs/products/55/RO4350B-Laminates.aspx, May 23, 2016, 2 pp.

"RO4400 Series Bondply Data Sheet," Data Sheet, Rogers Corporation, retrieved from https://www.rogerscorp.com/documents/1850/acs/RO4400-Series-Bondply-Data-Sheet-RO4450B-and-RO4450E-Bondply.pdf, May 23, 2016, 2 pp.

"Technical Feature: I/Q Phase Dectector O-MFA-1108," Signal Technology Corporation, retrieved from http://www.radartutorial.eu/10.processing/I+Q_phase_detector.pdf on May 9, 2016, 1 pp.

Analog Devices, 2-Channel, 500 MSPS DDS with 10-Bit DACs, AD9958, Analog Devices, Inc., http://www.analog.com/media/en/technical-documentation/data-sheets/AD9958.pdf, May 23, 2016, 44 pp.

Analog Devices, "Differential Input, Dual, Simultaneous Sampling, 4.2 MSPS, 14-Bit, SAR ADC," AD7357, Analog Devices, Inc., retrieved from http://www.analog.com/media/en/technical-documentation/data-sheets/AD7357.pdf May 23, 2016, 24 pp.

Analog Devices, "Differential Input, Dual, Simultaneous Sampling, 5 MSPS, 12-Bit, SAR ADC," AD7356, Analog Devices, Inc., retrieved from http://www.analog.com/media/en/technical-documentation/data-sheets/AD7356.pdf, May 23, 2016, 20 pp.

Analog Devices, Direct Modulation/Fast Waveform Generating, 13 Ghz, Fractional-N Frequency Synthesizer, ADF4159, Analog Devices, Inc., 2014, 36 pp.

Analog Devices, "Octal Ultrasound AFE with Digital Demodulator," AD9670, Analog Devices, Inc., retrieved from http://www.analog.com/en/products/applicationspecific/medical/ultrasound/ad9670.html#productoverview, May 20, 2016, 7 pp.

Beal., "Wi-Fi," Webopedia, retrieved from http://www.webopedia.com/TERM/W/Wi_Fi.html, May 26, 2016, 1 pp.

Deslandes et al., "Integrated Microstrip and Rectangular Waveguide in Planar Form," Microwave and Wireless Components Letters, IEEE, vol. 11 No. 2, Feb. 2001, 5 pp.

Gentile et al., "Direct Digital Synthesis Primer," DDS Primer, Analog Devices, retrieved from https://www.ieee.li/pdfviewgraphs/direct_digital_synthesis.pdf, May 2002, 50 pp.

Huang et al., "Design and Modeling of Microstrip Line to Substrate Integrated Waveguide Transitions," Electrical and Electronic Engineering, Apr. 1, 2010, 23 pp.

Kopp, "Assessing the Tikhomirov NIIP L-Band Active Electronically Steered Array," Air Power Australia Analyses, retrieved from http://www.ausairpower.net/APA200906.html, Jan. 27, 2014, 24 pp.

Kumar et al., "A Review on Substrate Integrated Waveguide and its Microstrip Interconnect," Journal of Electronics and Communication Engineering, vol. 3 Issue 5, Sep.-Oct. 2012, 5 pp.

Madadi et al., Analysis and Design of I/Q Charge-Sharing Band-Pass-Filter for Superheterodyne Receivers, Transactions on Circuits and Systems I, vol. 62 No. 8, IEEE, Aug. 2015, 8 pp.

U.S. Appl. No. 14/488,154, by David C. Vacanti, filed Sep. 16, 2014.

U.S. Appl. No. 15/253,471, by David C. Vacanti, filed Aug. 31, 2016.

Hittite, "Analog Devices Welcomes Hittite Microwave Corporation," Data Sheet HMC863LP4E, accessed on May 23, 2016, from http://www.analog.com/media/en/technical-documentation/data-sheets/hmc863.pdf, 10 pp.

Response to Extended Search Report dated Feb. 26, 2018, from counterpart European Application No. 17173844.6, filed May 22, 2018, 15 pp.

* cited by examiner

INTEGRATED DIGITAL ACTIVE PHASED ARRAY ANTENNA AND WINGTIP COLLISION AVOIDANCE SYSTEM

This application claims the benefit of U.S. Provisional Application No. 62/343,704, filed May 31, 2016, the entire content of which is hereby incorporated by reference.

TECHNICAL FIELD

The disclosure relates to collision avoidance systems and antennas for use in collision avoidance systems.

BACKGROUND

Detecting and tracking nearby objects may be useful, particularly for aircraft during ground operations. Ground collisions between aircraft and other objects, such as other aircraft, ground vehicles and structures such as buildings can cause expensive damage and may be dangerous. Aircraft taxiing for takeoff often have full fuel tanks, which may rupture during a collision leading to possible fire or explosion. Some solutions have radar or other sensors placed at the on the aircraft to detect potential obstacles and present information to the pilot on a human-machine interface (e.g., head-up, head-down, or head-mounted display). Having such information available may improve pilot awareness of obstacles and help evaluate if a particular obstacle is a threat. Some systems provide information about only the lateral location of obstacles relative to an aircraft, which may not explicitly address whether the height of the wing, wingtips, or engine nacelle will clear the obstacles. Three-dimensional information about potential dangers may be more valuable than just lateral information. Some systems may be expensive or impossible to install because the system may require expensive rework to run power and signal cables between the sensors and the display unit in the cockpit.

Other systems may include radar sensors mounted on the wingtips that take advantage of existing lighting to 'see' through the protective glass that covers the lighting. Non-standard glass material and thickness may cause transmission and accuracy issues for these radar sensors. Also, any modifications to the wings may interfere with deicing systems, moveable wing structures such as Fowler flaps or require cables running near or through fuel tanks, which may be in the wings of many commercial aircraft. Therefore, modifications to the wings may have disadvantages in that modifications may impact safety and aircraft certification. Any collision avoidance system mounted in an aircraft wing may likely be part of the aircraft original design.

SUMMARY

In general, the disclosure is directed to techniques for a slot waveguide antenna array that include substrate integrated waveguide (SIW) elements in a multi-layer circuit board. The specific dimensions of the SIW components (vias, coupling slots, and other features) as well as the layout and relationship to other components of the antenna provide unique advantages over other existing techniques. The dimensions include spacing between the vias, the width and other dimensions of the waveguide, placement and dimensions of terminal edges, coupling slots, and other features. The advantages include an efficient transmit and receive radar pattern with improvements in energy directed to the main lobe rather than wasted in side lobes. Other advantages include low-cost, consistent and reliable manufacturing as well as a highly integrated and robust antenna.

In one example, this disclosure is directed to a slot waveguide antenna array device comprising a plurality of substrate integrated waveguide (SIW) elements. Each SIW element may comprise first and second SIW portions configured to operate with a first radio-frequency (RF) energy of a first wavelength (e.g. A$\lambda$g). The first SIW portion may include: a radiating slot layer, a plurality of vias arranged in a first row and a second row, wherein: each via is a plated via, a centerline of each via in the first row is ⅛A$\lambda$g from a centerline of an adjacent via in the first row, a centerline of each via in the second row is ⅛A$\lambda$g from a centerline of an adjacent via in the second row, the first row of vias is substantially parallel to the second row of vias, and a centerline of the first row of vias is ¾A$\lambda$g from a centerline of the second row of vias.

In another example, this disclosure is directed to a slot waveguide antenna array system comprising a multi-layer circuit board. The multi-layer circuit board may comprise: a plurality of substrate integrated waveguide (SIW) elements, wherein each SIW element of the plurality of SIW elements is at least one of a transmitter SIW element or a receiver SIW element and each receiver SIW element defines a receiver channel of the slot waveguide antenna array system. The multi-layer circuit board may also include at least one signal layer comprising: at least one receiver (Rx) mixer element, a power divider element, wherein the power divider element connects a local oscillator (LO) signal to the at least one receiver Rx mixer element, wherein each receiver SIW element of the plurality of SIW elements connects to an input of the at least one Rx mixer element, and at least one circuit layer comprising: a plurality of hardware components, a plurality of communication paths, wherein at least one communication path connects an output of the receiver Rx mixer element to at least one of the plurality of hardware components.

The details of one or more examples are set forth in the accompanying drawings and the description below. Other features, objects, and advantages will be apparent from the description and drawings, and from the claims.

DETAILED DESCRIPTION

This disclosure describes various techniques related to collision avoidance systems and antennas for use in such collision avoidance systems. A collision avoidance system in accordance with the techniques of this disclosure may use radar to detect unwanted objects in a coverage area, and in response to detecting an unwanted object in the coverage area, send a notification to an operator. In one example, a collision avoidance system of this disclosure may be installed on an airplane, and the coverage area may be the area surrounding a wingtip or nose of the aircraft. In another example, a collision avoidance system of this disclosure may be installed on a sea vessel, and the coverage area may be all or a portion of the area surrounding the vessel. As will be explained in more detail below, in order to constrain the coverage area to a desired area that is large enough to adequately detect potential hazards but still small enough to not yield a large number of false positives, a radar collision avoidance system of this disclosure may include an antenna that utilizes one or more of digital beam forming, electromagnetic band-gap isolation, a substrate integrated waveguide (SIW), and other such features.

In some implementations, the collision avoidance system, including both the antennas and associated electronics, may be implemented into a single integrated package. The single integrated package may, in many instances, be small enough and light weight enough to be installed in a variety of locations such as in the radome at the top of the vertical stabilizer of an aircraft. Additionally, the collision avoidance system may communicate wirelessly with a display or user terminal such that the collision avoidance system can be installed without the need for long wiring runs. In other examples, the collision avoidance system may implement other techniques to communicate with other systems, such as a user terminal, flight information system, vehicle information system, railroad or automobile traffic management system or similar. The collision avoidance system may communicate with others systems using optical, wired (e.g., Ethernet, USB, etc.), or other similar connections or communications mediums.

Figure 1A:
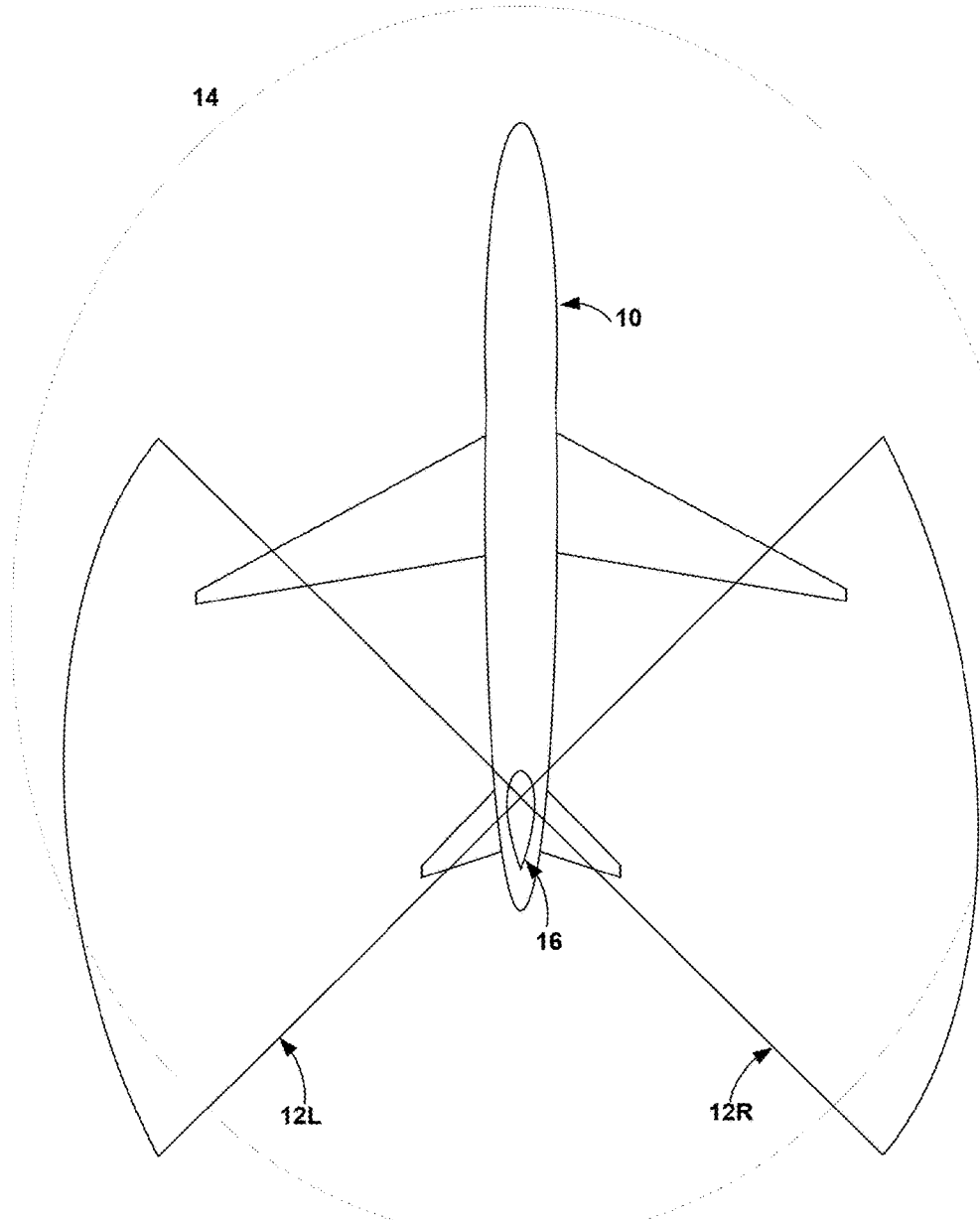
FIG. 1A is a conceptual diagram illustrating an example coverage area of a collision avoidance system mounted on an aircraft.

FIG. 1A is a conceptual diagram illustrating an example coverage area of a collision avoidance system mounted on an aircraft. FIG. 1A depicts aircraft 10 with an example collision avoidance system, which may be mounted in or on vertical stabilizer 16 of aircraft 10. The example collision avoidance system may be configured to detect objects in a left radar coverage area 12L and a right radar coverage areas 12R (collectively "radar coverage area 12"). Radar coverage area 12 may include an area approximately 80 degrees wide. Information from the collision avoidance system may combine with information from a weather radar system that may be mounted in the nose radome of aircraft 10. The full weather radar system carried in the nose of the aircraft may be used during ground operation to cover a region between 120 and 180 degrees wide from the nose location.

The example collision avoidance system may additionally be configured to communicate, for example via Wi-Fi, over communication area 14. The illustration of communication area 14 represents only one example of a communication area. Other sizes and shapes of communication areas may also be used. The Wi-Fi communication area 14 may be generated by communication circuitry within the collision avoidance system. The communication circuitry may receive target detection information from targets detected within radar coverage area 12 and transmit target detection information to at least one external display within communication area 14. Wi-Fi coverage area may also be described a wireless local area network (WLAN). The collision avoidance system may transmit signals within Wi-Fi communication area 14 to external displays within aircraft 10, or to other displays outside of aircraft 10. For example, one or more safety observers, or "wing walkers" helping to guide aircraft 10 during ground operations may carry display units that may receive target detection information from the collision avoidance system.

A collision avoidance system may also be installed near the passenger gate at an airport to assist in guiding an aircraft to the terminal. In this taxi guidance example, the collision avoidance system may communicate with other devices, such as display devices, using wireless or wired communication techniques.

Other example applications for the collision avoidance system may include use on helicopters for collision avoidance and landing assistance in a degraded visual environment (DVE) such as blowing dust or snow. An unmanned aerial vehicle (UAV) may include a collision avoidance system. A collision avoidance system may be mounted on a train or at a railroad crossing to notify the train operators, or railroad traffic management, of potential obstacles. A collision avoidance system may be used on a sea vessel for guidance during restricted maneuvering, such as entering or exiting port or transiting a channel or canal. The collision avoidance system on a sea vessel may also be used as early warning when faced with the risk of piracy in certain areas of the world. Although the techniques of this disclosure will primarily be described with reference to an aircraft, it should be understood that the techniques described herein are not limited to aircraft and can be implemented on other types of vehicles and vessels, as well as on stationary structures as well.

Figure 1B:
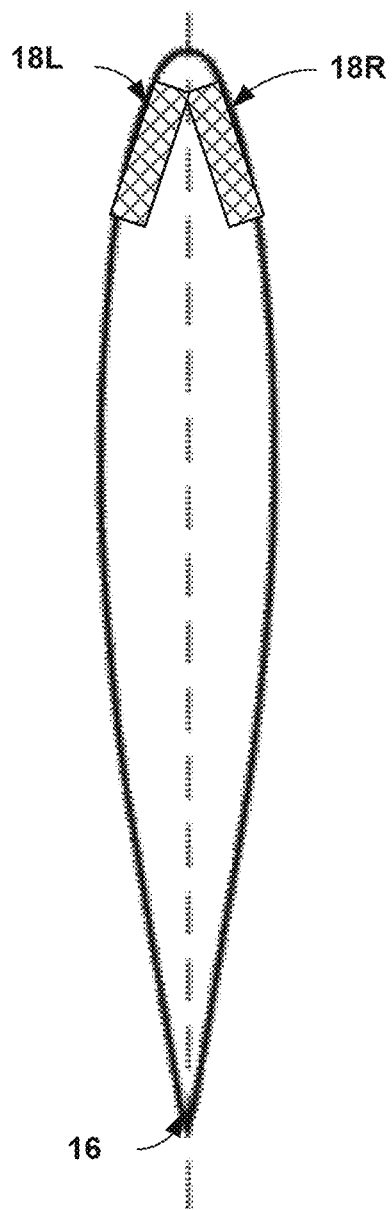
FIG. 1B is a conceptual diagram illustrating a more detailed view of an example position of a collision avoidance system mounted in a vertical stabilizer of an aircraft.

FIG. 1B is a conceptual diagram illustrating a more detailed view of an example position of a collision avoidance system mounted in vertical stabilizer 16 of aircraft 10. The example collision avoidance system may include one or more integrated radar systems mounted in the vertical stabilizer 16 of aircraft 10. For example, integrated radar system 18L may include monopulse radar circuitry, a slotted waveguide radar transmit antenna, a slotted waveguide radar receive antenna, and external communication circuitry. In some examples, the various components of the collision avoidance system may be housed in a single, integrated package. Integrated radar system 18L may mount in an existing radome on top of the vertical stabilizer 16 of aircraft 10. In this disclosure the terms "slot waveguide" and "slotted waveguide" may be used interchangeably. The existing radome may be the same radome used by the VHF omni-directional range (VOR) navigation antenna. The collision avoidance system may include two integrated radar systems 18L and 18R mounted on the left and right sides of the existing radome, which may provide coverage on both sides of aircraft 10, including coverage beyond both wingtips of aircraft 10. For example, integrated radar systems 18L and 18R may provide radar coverage area 12 as shown in FIG. 1B.

Integrated radar system 18L may be configured to avoid other structures that may be included in an aircraft vertical stabilizer. For example, some vertical stabilizers may include a conductive strip that is part of a lightning strike protection system. Also, in some examples, a vertical stabilizer may include one or more antennae, such as a high frequency (HF) long range communication antenna. A collision avoidance system and integrated radar system configured to not interfere with such structures, as well as configured so these structures do not interfere with the integrated radar system performance, may have advantages over other examples. In one example, integrated radar system 18L may be approximately four inches tall, eight inches long, and one inch thick (4"×8"×1"). In other examples, such as on a UAV, the integrated radar system may be smaller.

Also, integrated radar system 18L may be configured to draw power from existing power within a vertical stabilizer with minimum modification. For example, an integrated radar system 18L may be configured to draw power from the existing system already in place within the vertical stabilizer. As the collision avoidance system would have the largest advantage during ground operations, such as taxiing, an integrated radar system that drew power from an existing system, only used on the ground, would have advantages over other examples. For example, the integrated radar system could draw power from a taxi lighting system, used only during ground operations.

Figure 2A:
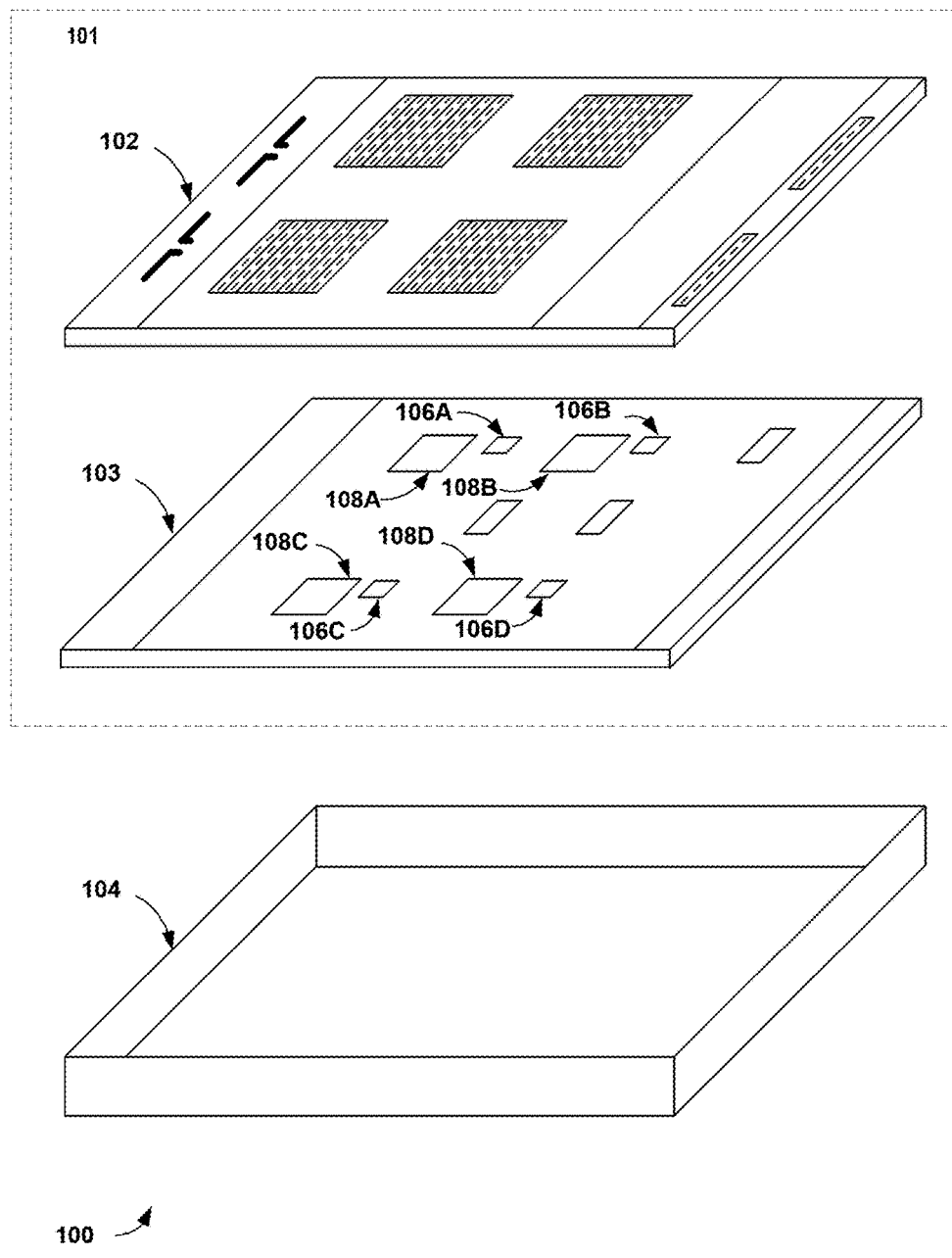
FIG. 2A is a conceptual and assembly diagram illustrating an exploded view of an example integrated radar system, which may be a component of a collision avoidance system in accordance with one or more techniques of this disclosure.

FIG. 2A is a conceptual and assembly diagram illustrating an exploded view of an example integrated radar system, which may be a component of a collision avoidance system in accordance with one or more techniques of this disclosure. FIG. 2A illustrates an example integrated radar system 100 which may include a SIW Tx antenna and a protective cover or shield 104. Integrated radar system 100 may, for example, be the same type of integrated radar system as integrated radar system 18L and 18R shown in FIG. 1B. In the example of FIG. 2A, the integrated radar system is implemented as a multi-layer printed circuit board (PCB) 101 that includes an SIW antenna layer 102 and one or more circuit layers 103. Circuit layers 103 may include 8-channel receiver chips 108A-108D, analog-to-digital (A/D) converters 106A-106D as well as other circuit elements. An analog-to-digital converter may also be called an "ADC."

Multi-layer PCB 101 may include circuits and components that implement radar transmitter electronics, radar receiver electronics, one or more processors, communication electronics, power conditioning and distribution, clock/timers and other circuitry and components. The one or more processors may be configured to control the radar transmitter electronics and radar receiver electronics as well as process and identify radar targets and send notifications and information to users using the communication electronics. A processor may include, any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

The SIW antenna layer 102 may be electrically connected to circuit paths and components on one or more circuit layers 103. In some examples, plated vias may provide connections between one or more circuit layers 103, as well as to SIW antenna layer 102. A via may be a plated or unplated hole that may be drilled, etched or otherwise formed between layers of multi-layer PCB 101. A plated via may be plated with a conductive material to electrically connect layers. Some examples of conductive material may include copper, solder, conductive epoxy or other materials.

Protective shield 104 may cover and provide structural support for example integrated radar system 100. Protective shield 104 may be a molded plastic, stamped or formed sheet metal or other suitable material. Protective shield 104 may include a conductive coating in one or more areas to provide shielding for electromagnetic interference (EMI). Protective shield 104 may include penetrations for power, communication or other connections as well as be configured to securely mount integrated radar system 100.

In operation, integrated radar system 100 may provide digital electronic beam steering on received radar reflections by using, in part, phase shift commands within the components on one or more circuit layers 103. The radar transmit electronics, in signal communication with the radar transmit antenna, are configured to output, e.g., transmit, monopulse radar signals that are a fixed, wide beam illumination. The radar receiver electronics in signal communication with the radar receive antenna search the reflected radar signals by a "pencil beam" monopulse receive pattern that scans within the illuminated transmit area. In other words, integrated radar system 100, in this example, is a frequency modulated continuous wave (FMCW) dual antenna radar system that provides wide beam illumination on transmit and then an electronically scanned receive beam that searches within the wide transmit illumination area. The FMCW radar signals provide very fine range resolution and allows very low receiver bandwidth and low data rates. This includes resolution in all three dimensions. In other words, integrated radar system 100 may locate the X, Y and Z position of possible collision threats. Locating the height of a target may have the advantage of reducing false alarms. For example, the collision avoidance system may detect an object that will pass under the wings but be at a height that will pose no danger to the wings, engine nacelles or other portions of an aircraft.

The digital electronic beam steering at baseband frequencies provides the advantage of reduced cost and complexity because of fewer radio frequency (RF) components. Digital electronic beam steering may also be capable of receiving multiple simultaneous beams.

In one example, integrated radar system 100 may use a heterodyne FMCW radar with a 16 MHz first intermediate frequency (IF) before down conversion to a baseband between 1 KHz and 2 MHz. Integrated radar system 100 may apply the 16 MHz offset using a dual direct digital synthesis (DDS) at the transmit array. A heterodyne system may provide advantages over other FMCW radars that use a homodyne receiver to directly convert RF signals to baseband near zero frequency. Integrated radar system 100 may include components with a passband that includes 16 MHz. These components may also provide simultaneous down conversion to base band, I/Q channel formation and four-bit phase shift. By using multi-function components along with frequency down conversion, integrated radar system 100 may provide advantages over a standard homodyne receiver, even if the homodyne receiver used an I/Q mixer on receive. In this way, integrated radar system 100 may achieve performance advantages. A few examples include I/Q accuracy (true 90 degree offset), four-bit phase shift, fine range and elevation resolution, low receiver bandwidth, low data rates, small size, light weight, low power consumption, integrated package and easy retrofit of existing platforms.

Figure 2B:
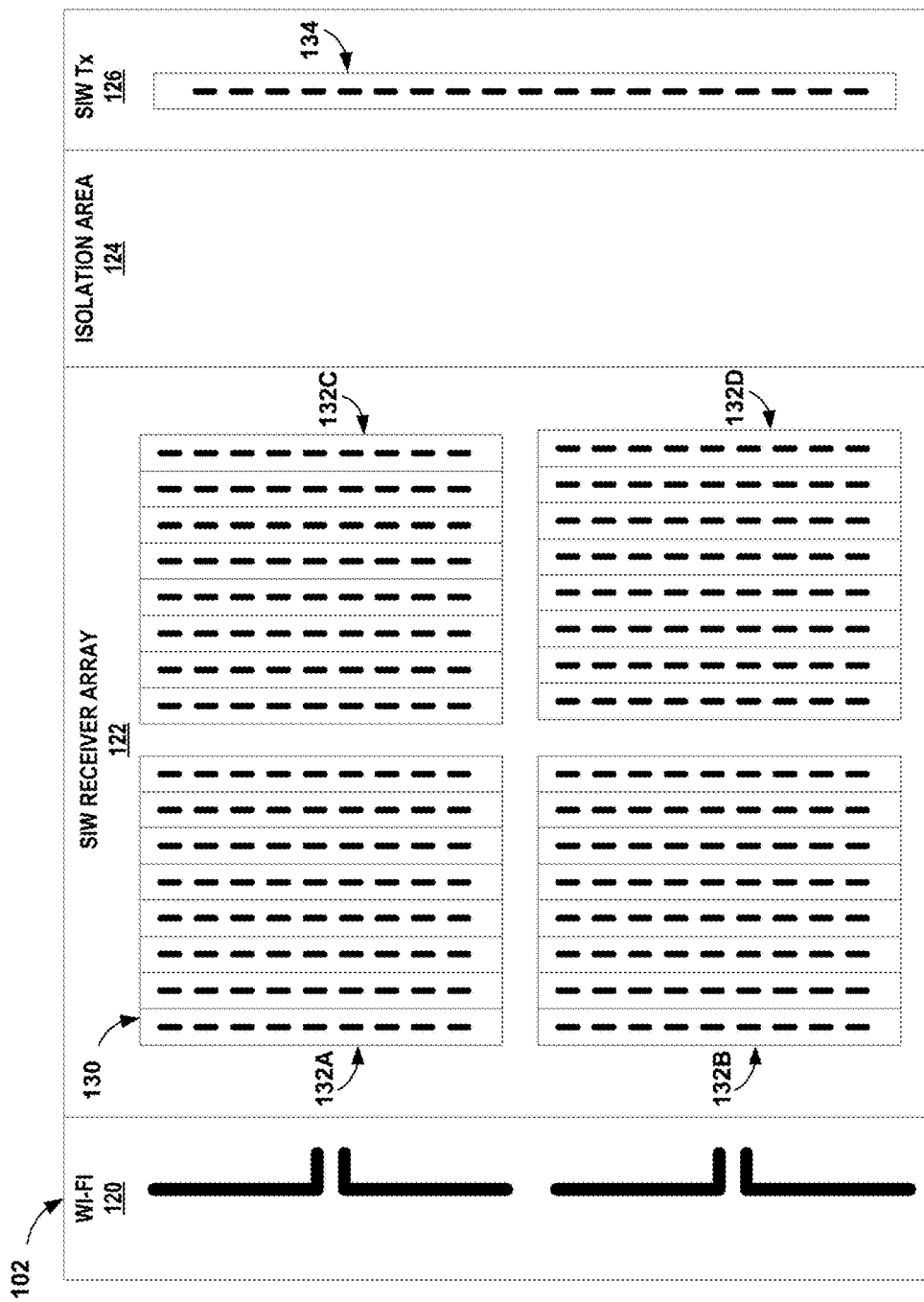
FIG. 2B is a conceptual diagram illustrating the transmission, receive, and communication antennae of an example integrated radar system, which may be a component of a collision avoidance system in accordance with one or more techniques of this disclosure.

FIG. 2B is a conceptual diagram illustrating the transmission, receive and communication antennae of an example integrated radar system, which may be a component of a collision avoidance system in accordance with one or more techniques of this disclosure. FIG. 2B illustrates a more detailed view of the radiating and receiving portion of SIW antenna layer 102 shown in FIG. 2A. SIW antenna layer 102 may include a Wi-Fi antenna 120, an SIW receiver (Rx) array 122, an isolation area 124 and an SIW transmit (Tx) antenna 126. SIW Rx array 122 may include one or more radar receiver antenna subarrays 132A-132D. Each subarray may include an SIW antenna device 130. In the example of FIG. 2B, each radar receiver antenna subarray 132A-132D contains eight SIW antenna devices. For clarity, FIG. 2B only shows SIW antenna device 130 with a number. SIW antenna device 130 may also be referred to as a slotted waveguide antenna device. Therefore, SIW Rx array 122 may be considered a slotted waveguide radar receive antenna. SIW Tx antenna 126 may be considered a slotted waveguide radar transmit antenna.

SIW Tx antenna 126 may include one or more SIW Tx antenna devices 134A and 134B (collectively SIW Tx antenna device 134). Each SIW Tx antenna device 134 may be similar to SIW antenna device 130 in construction and function. SIW Tx antenna 126 (or slotted waveguide radar transmit antenna) may be in signal communication with the radar transmitter electronics. The radar transmitter electronics, in conjunction with the slotted waveguide radar transmit antenna, may be configured to output radar signals to a predetermined coverage area. The predetermined coverage area may be similar to radar coverage area 12 shown in FIG. 1A. The terms radar transmit electronics and radar transmitter electronics may be used interchangeably in this disclosure.

SIW Rx array 122 (or slotted waveguide radar receive antenna) may be in signal communication with radar receiver electronics. The radar receiver electronics may include digital beam forming circuitry configured to receive radar reflections corresponding to the outputted radar signals from the radar receive antenna. The outputted radar signals may reflect off objects present in the predetermined coverage area. The radar receiver electronics may send information to the one or more processors about the reflected signals from objects present in the predetermined coverage area. The one or more processors may be configured to generate a notification in response to a radar reflection received from the first coverage area.

Isolation area 124 may be used to isolate the outputted radar signals coming from SIW Tx antenna 126 from interfering with SIW Rx array 122. Isolation area 124 may have dimensions and be composed of material to ensure proper function of integrated radar system 100. For example, isolation area 124 may be a structure such as an electronic band gap structure or an absorptive structure. The dimensions and/or material may vary depending on the operating frequency of integrated radar system 100.

Wi-Fi antenna 120 may be configured to transmit and receive signals used to communicate using a wireless local area network (WLAN). Wi-Fi antenna 120 may be communicatively coupled to electronic communication circuitry within integrated radar system 100 configured to receive information from one or more processors within integrated radar system 100. For example, the electronic communication circuitry may be part of multi-layer PCB 101. The electronic communication circuitry, in conjunction with Wi-Fi antenna 120 may be configured to communicate with display units or other units external to integrated radar system 100. Some examples of external display units may include tablet computers or hand-held mobile devices.

Figure 3A:
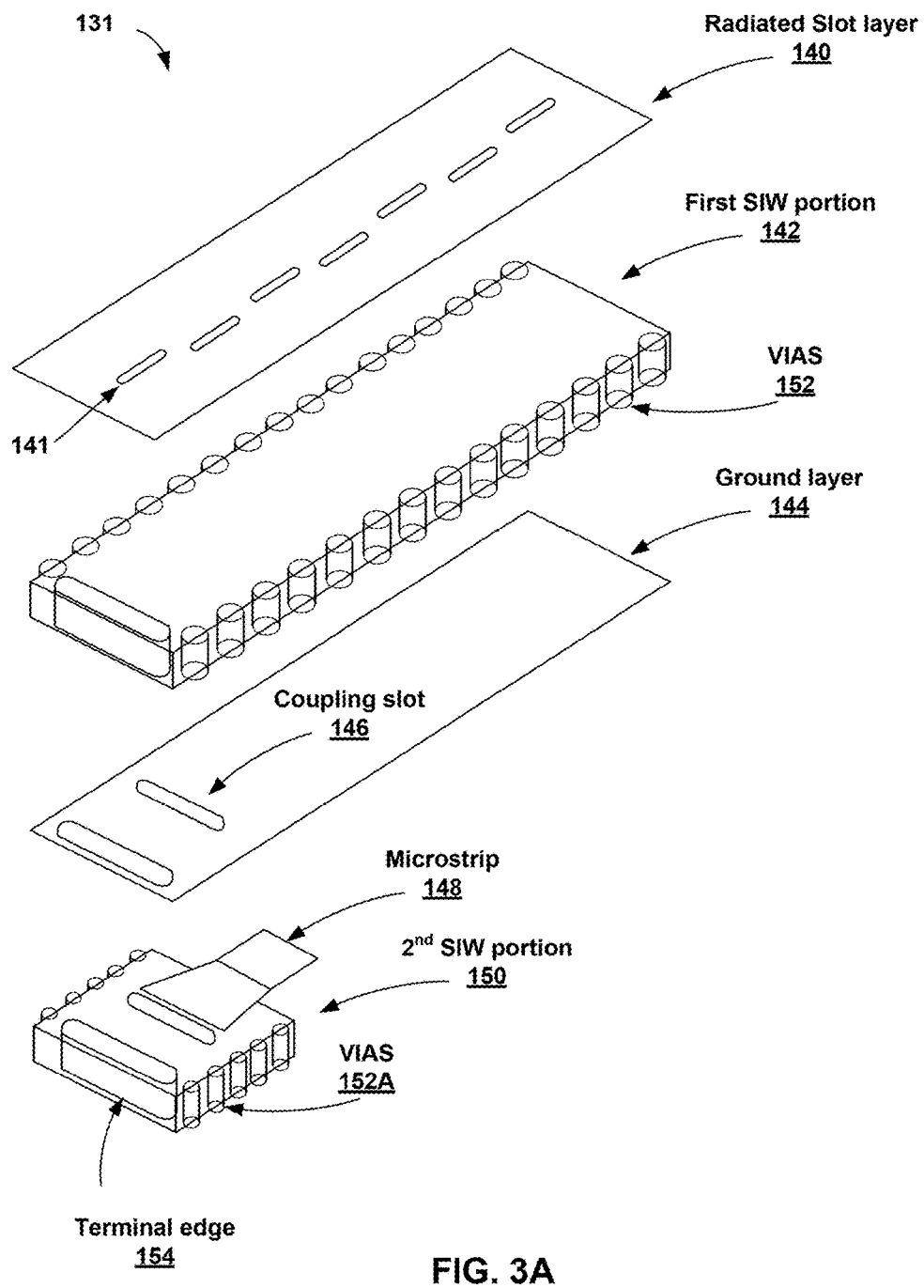
FIG. 3A is a three-dimensional view illustrating an example substrate integrated waveguide (SIW) element in accordance with one or more techniques of this disclosure.

FIG. 3A is a three-dimensional view illustrating an example SIW element in accordance with one or more techniques of this disclosure. SIW element 131 may be a component of SIW antenna device 130 shown in FIG. 2B. SIW element 131 may include a radiating slot layer 140, a first SIW portion 142, a ground layer 144 and a second SIW portion 150. SIW element 131 may be configured to operate with a first radio-frequency (RF) energy of a first wavelength (Aλg), where Aλg is the wavelength of the first RF energy inside the SIW material and Aλ is the wavelength of the first RF energy in free space.

The first SIW portion 142 may include two or more rows of vias 152. Each via may be a plated via, that is, the inner surface of each via may be plated with a conductive material such as copper. Dimensions for vias as well as spacing and relationship to slots in radiating slot layer 140 will be discussed in more detail in FIG. 3D below.

Radiating slot layer 140 may form a first layer of each SIW and may be electrically connected to, but not penetrated by each via 152. Radiating slot layer 140 may include a plurality of slots arranged in a row of slots 141. The row of slots 141 may run parallel to the rows of vias 152 and between each row of vias. Each slot of the plurality of slots may penetrate the radiating slot layer 140. Ground layer 144 may form a second layer of the first SIW portion and may be electrically connected to, but not penetrated by each via 152. Therefore, ground layer 144 may be electrically connected to radiating slot layer 140.

Second SIW portion 150 may include two or more rows of vias 152A and microstrip transition 148. Second SIW portion 150 may bond to ground layer 144. Vias 152A may electrically connect to, but not penetrate ground layer 144. Therefore, vias 152A, vias 152, ground layer 144 and radiates slot layer 140 are electrically connected. Moreover, vias 152A, vias 152 may be considered 'blind holes,' in that the holes connect, but do not penetrate a metal layer, such as ground layer 144. Therefore, the vias on different layers may be configured to overlap vertically. In other words, the vias may be configured to line up with each other, but without physically connecting. This arrangement may have advantages in a variety of applications, because, for example, the arrangement may offer flexibility in circuit layout. Both first SIW portion 142 and second SIW portion 150 may include one or more bondply layers.

Microstrip transition 148 may have specific dimensions and shape that depend on the signal frequency. Microstrip transition 148 may be positioned in relation to coupling slot 146 such that microstrip transition 148 stimulates coupling slot 146.

Coupling slot 146 may penetrate ground layer 144. Coupling slot 146 may connect first SIW portion 142 to second SIW portion 150. In some examples, SIW element 131 is a receive element. Reflected radar signals impinging on radiating slot layer 140 may penetrate to first SIW portion 142. First SIW portion 142 may guide any received RF energy from the reflected radar signals to coupling slot 146. Coupling slot 146 may couple the RF energy further to second SIW portion 150. In other examples, SIW element 131 is a transmit element. Second SIW portion 150 may receive RF energy from the radar transmitter electronics and couple the RF energy to first SIW portion 142 through coupling slot 146.

Terminal edge 154 may penetrate second SIW portion 150, ground layer 144 and first SIW portion 142. The example of FIG. 3A depicts terminal edge 154 as a slot passing between the layers. In this example, the slot may be plated with a conductive material, such as copper. The long edge of terminal edge 154 may be perpendicular to the row of vias 152. Terminal edge 154 may electrically connect, but not penetrate radiating slot layer 140. Therefore, terminal edge 154 may electrically connect radiating slot layer 140 to ground layer 144. Specific dimensions for terminal edge 154, spacing and physical location relative to other features of SIW element 131 will be discussed in more detail below, such as FIG. 3D.

The SIW may be constructed of copper clad PCB for the upper and lower waveguide surface, with the dielectric of the PCB for the waveguide volume and plated vias (aka holes) for the waveguide walls. In other words, SIW is a transmission line that creates a waveguide within a substrate. Its waveguide consists of two lines of holes as the wall of rectangular waveguide and the metallic layer on the top and bottom to form a rectangular cavity. The SIW waveguide suffers higher insert loss than aluminum waveguide caused by (a) the substrate, (b) the gap between holes and (c) the surface roughness between metallic layer and the substrate. But it brings a lot of advantages to develop radar system such as mono-pulse radar that generally requires 4 antenna beams. Some advantages include, SIW makes the rectangular waveguide very thin and light, it benefits many mechanically steered antennas as its lower weight and relatively small moment of inertia. An SIW antenna is a PCB version of a slotted waveguide antenna. An SIW antenna may have advantages over other types of slotted waveguide antennae, such as a slotted waveguide antennae constructed from aluminum. For example, the substrate filled in SIW structure makes it is possible to put more slots in one branch, thereby the SIW antenna array is able to offer a tight, narrow beam-width that is beneficial to many applications.

Some examples of SIW monopulse antenna array may have many difficulties. These may include the strong mutual coupling between slots, the difficulty in layout and positioning, the complex estimation of its equivalent guide wavelength and the difficulty of consistent manufacture, along with other difficulties. SIW antennae using the techniques of this disclosure may result in a SIW monopulse antenna array that is highly integrated, highly shielded, easy to manufacture and reliable.

Figure 3B:
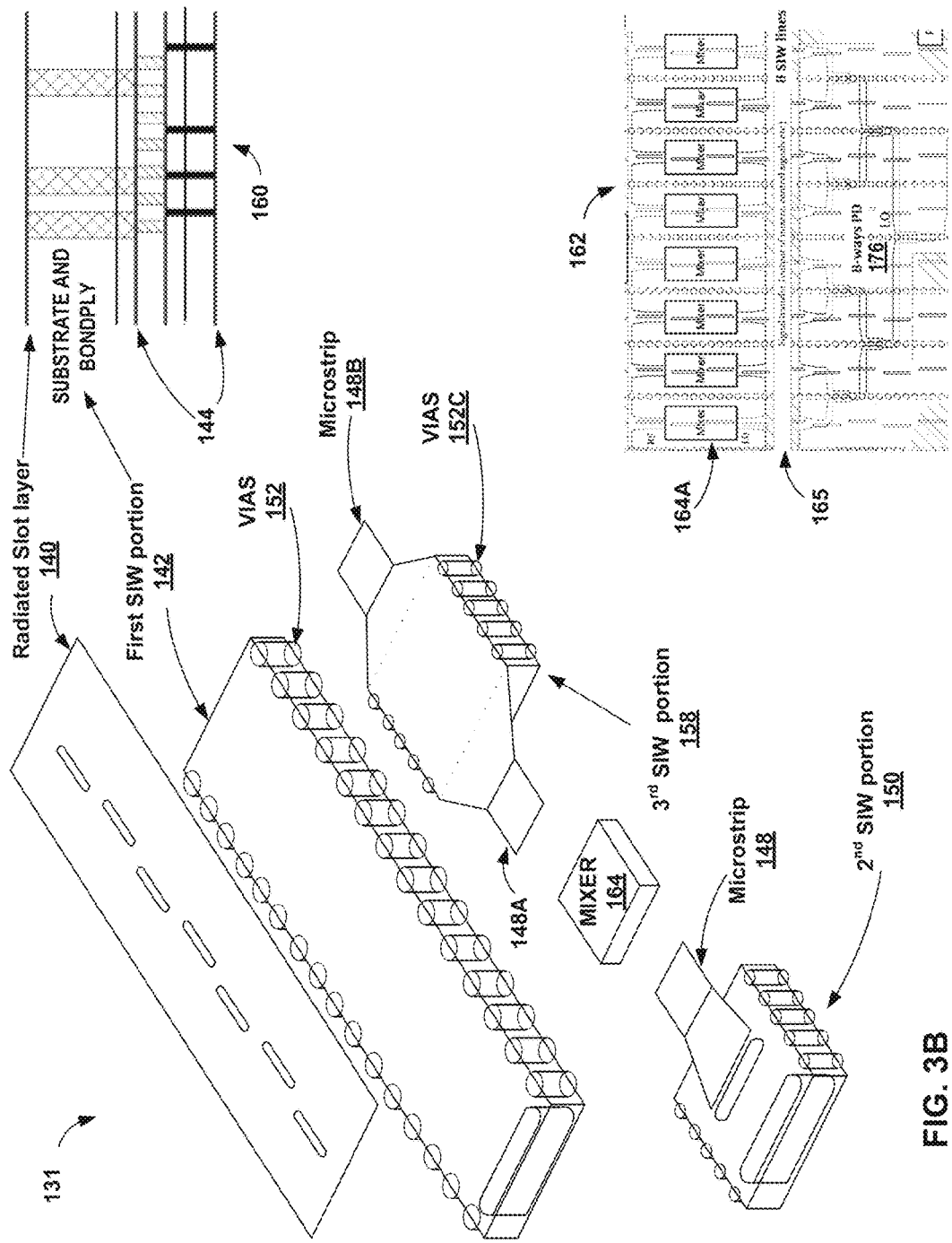
FIG. 3B illustrates a section of an example slot waveguide antenna array system with a separate mixer for each channel.

FIG. 3B illustrates a section of an example slot waveguide antenna array system with a separate mixer for each channel. FIG. 3B illustrates example SIW element 131 along with additional components, which may be part of an integrated slot waveguide antenna array system. As shown in FIG. 3A, SIW element 131 may include radiating slot layer 140, first SIW portion 142 and second SIW portion 150. Other components of SIW element 131, such as ground layer 144, omitted for clarity. FIG. 3B depicts additional elements including mixer 164 and third SIW portion 158. FIG. 3B also depicts an example cross section 160 of an example SIW antenna device and antenna subarray layout 162. Example cross section 160 illustrates radiating slot layer 140, first SIW portion 142, ground layer 144, a signal layer and an additional substrate and ground layer. Example cross section 160 illustrates a four-layer PCB, with a slot layer, a ground layer, a signal layer and a second ground layer with substrate in between each metal layer. In other examples, cross section 160 may illustrate a three-layer, five-layer or more layers.

Antenna subarray layout 162 may include eight SIW antenna devices, similar to SIW antenna device 130 shown in FIG. 2B. Each SIW antenna device may be dedicated to a separate radar channel. Antenna subarray layout 162 may also include a mixer 164A for each device/channel and an eight-way power divider (PD) 176. Example of antenna subarray layout 162 illustrates eight-way power divider 176 as laid out on the signal layer, as shown in cross section 160. Eight-way power divider 176 may be configured so each path length from the local oscillator (LO) is the same length. This may ensure the signal from the LO, such as a voltage controlled oscillator (VCO), arrives at each mixer 164A at the same time and with the same phase.

Third SIW portion 158 may include vias 152C and two microstrip transitions 148A and 148B. Vias 152C may be a different diameter and spacing than vias 152 and be configured to operate at a different RF energy than that used by the first SIW portion and the second SIW portion. Third SIW portion 158 may be configured to operate with an RF energy of a different wavelength and frequency. Third SIW portion 158 may connect mixer 164 to eight-way power divider 176 depicted in antenna subarray layout 162. The area of third SIW portion 158 may provide space for a signal transfer area 165. Signal transfer area 165 may carry signals such as output of mixers 164, control signals and other signals. Signal transfer area 165 may also include electronic components that may interact with signals carried by signal traces on signal transfer area 165. In one example, not shown in FIG. 3B, the output of mixers 164 may reach the signal transfer area using conductive vias different and distinct from vias 152, 152B or 152C. In the example of FIG. 3B, the power divider is on a metal layer of multi-layer PCB 101, rather than a waveguide, as may be found in other examples. A power divider on the metal layer may provide advantages in cost, manufacturability, reliability as well as allow a smaller size for the radar system.

Figure 3C:
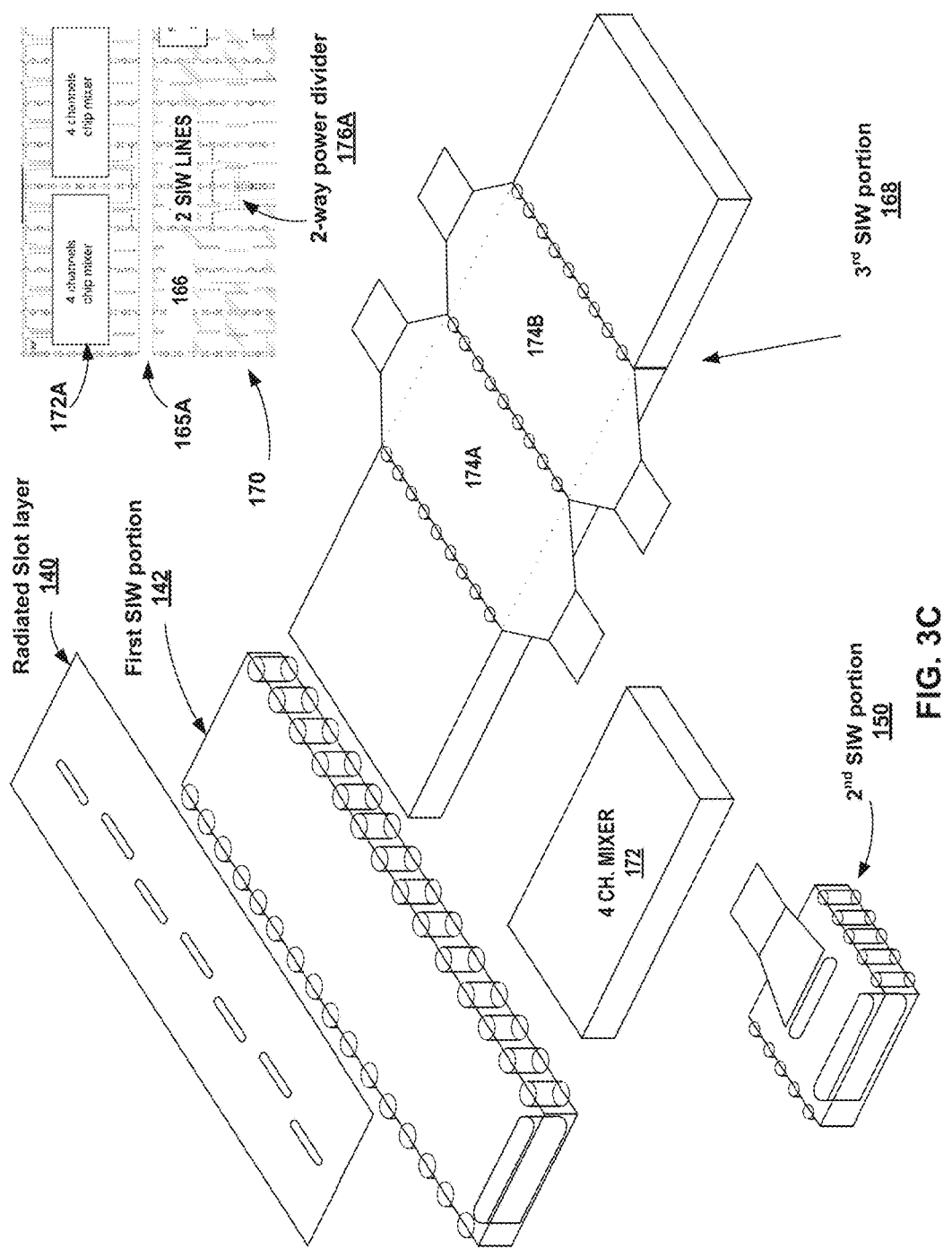
FIG. 3C illustrates a section of an example slot waveguide antenna array system with a four-channel mixer and single SIW portion connecting the mixer to a power divider and a local oscillator (LO).

FIG. 3C illustrates a section of an example slot waveguide antenna array system with a four-channel mixer and single SIW portion connecting the mixer to a power divider and a local oscillator (LO). FIG. 3C may be similar to FIG. 3B except instead of a separate mixer for each channel, the example of FIG. 3C depicts a four-channel mixer 172 and 172A. FIG. 3C also depicts an example antenna subarray layout 170 with eight antenna devices/channels, similar to antenna subarray layout 162, except example of FIG. 3C connects the LO to two four-channel mixer components and therefore only needs the two-way PD. The two-way PD 176A shown in FIG. 3C operates to connect the local oscillator (LO) to mixer 172, similar to the eight-way PD 176 for FIG. 3B. Because the example of FIG. 3C includes fewer mixers and fewer PD circuit traces, this may allow more space on the layers above and below third SIW portion 168 for additional components and/or space for additional circuit traces or components. In other words, because third SIW portion 168, which may include SIW elements 174A and 174B, may be larger than the similar third SIW portion 158, signal transfer area 165A may be larger than the similar signal transfer area 165. This may allow additional space for components or for traces to carry signals, for example in hardware component region 166. The terms "circuit trace", "trace" or "circuit path" may be used interchangeably in this disclosure.

Similar to the layout for eight-way power divider 176 shown in FIG. 3B, FIG. 3C illustrates example two-way power divider 176A with equal length paths. This may ensure the signal from the LO, such as a VCO, arrives at each mixer 172A at the same time and with the same phase.

Figure 3D:
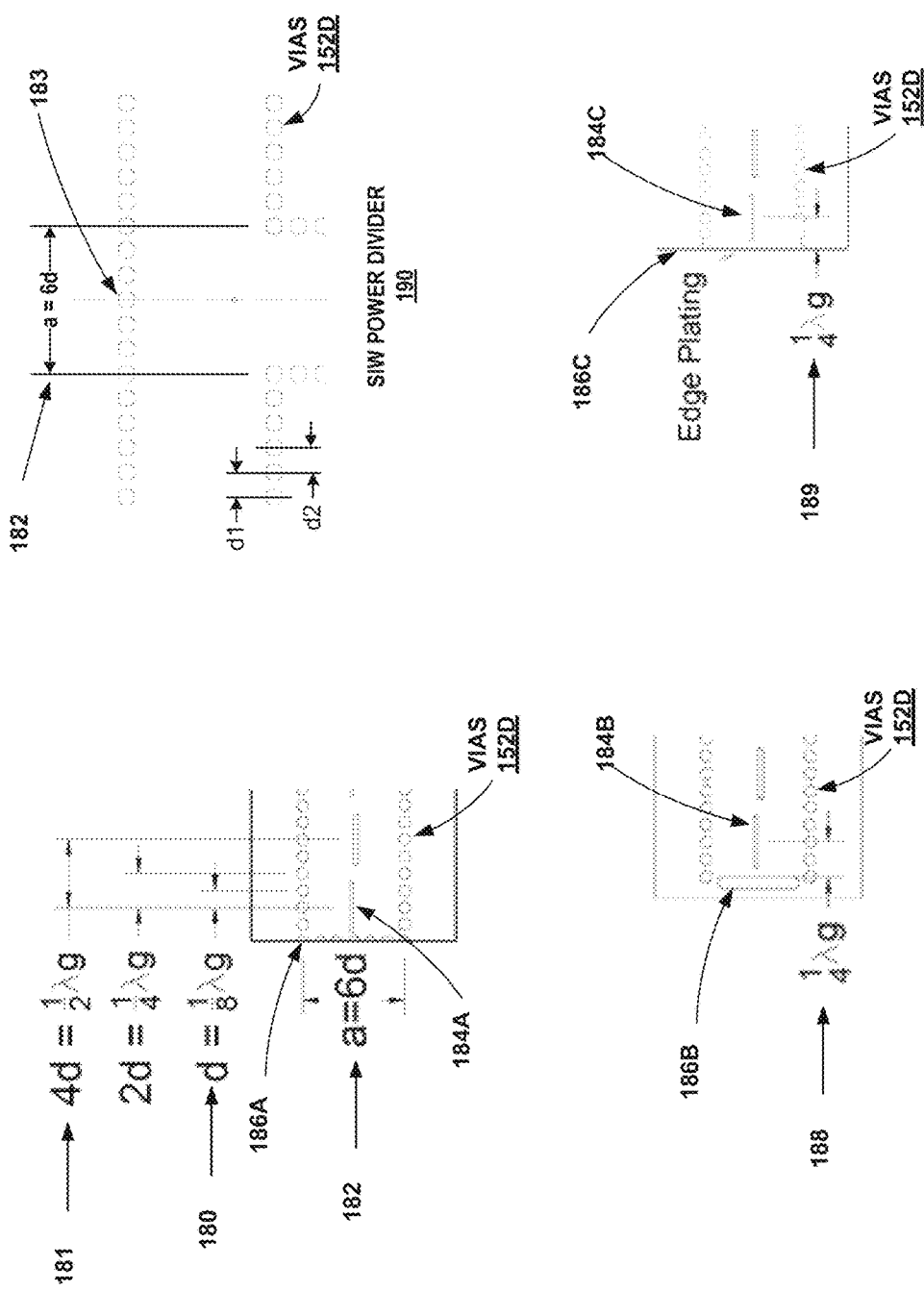
FIG. 3D is a two-dimensional view of an example SIW element illustrating dimensions and spacing in accordance with one or more techniques of this disclosure.

FIG. 3D is a two-dimensional view of an example SIW element illustrating dimensions and spacing in accordance with one or more techniques of this disclosure. FIG. 3D depicts a SIW defined by rows of plated vias or holes 152D. In this disclosure hole, plated hole, via and plated via may be used interchangeably, unless otherwise specified. FIG. 3D defines the spacing between centerline of adjacent holes in each row to be substantially equal, where substantially equal means equal within manufacturing tolerances. In other words, the spacing between adjacent holes in the same row is equal, plus or minus any variations in manufacturing. For example, d1=d2 as shown in SIW power divider 190. Note that SIW power divider 190 is different from the eight-way PD 176 and two-way PD 176A described above. SIW power divider 190 is a power divider implemented in SIW material and construction. The eight-way PD and two-way PD described above are implemented on a circuit layer or signal layer and may be of metal or other conductive material. SIW power divider 190 is another example of an SIW layout in accordance with the techniques of this disclosure. SIW power divider 190 is not shown in FIGS. 3A-3C.

The equal distance between hole centerline d1 and d2 may be divided evenly by ¼ equivalent guide wavelength according to the equation (N*d=¼ λg). In the example of FIG. 3D, the equal hole spacing may be defined as ⅛ λg. In other words, the via spacing may be selected to operate for a particular wavelength/frequency of RF energy. Therefore, for each row of vias 152D, a centerline of each via in the first row of vias may be ⅛Aλg from the centerline of an adjacent via in the first row of vias. Similarly, a centerline each via in the second row of vias of may be ⅛Aλg from the centerline of an adjacent via in the second row of vias.

The example of FIG. 3D defines the SIW waveguide width (a) as even multiple of the equal distance (d) between the centerlines of each row of vias according to the equation a=(2n)*d. For example, selecting n=3 results in an SIW width a=6d (182). Selecting the SIW width a=6d results in a hole 183 in the center of the short edge, as shown in SIW power divider 190. This may have performance advantages over other selections. As shown in FIG. 3D, the first row of vias is substantially parallel to the second row of vias and a centerline of the first row of vias is ¾Aλg=6d (182) from a centerline of the second row of vias. Here, substantially parallel means parallel within manufacturing tolerances. In other words, the centerline of the first row is parallel to the centerline of the second row, plus or minus any variations in manufacturing.

Variations and tolerances apply throughout this disclosure. For example, SIW width 182 described above as a=6d should be understood to mean a=6d±tolerances from manufacturing or other sources.

FIG. 3D also depicts a row of radiating slots. By selecting the length, spacing and position of each radiating slot in the row of radiating slots, the reflection around each slot can be the same, that is, by repeating four holes for each ½ λg (181). FIG. 3D depicts final radiating slots 184A-184C in the row of radiating slots. In other words, selecting each radiating slot to have the same length and spacing, and placing a long-edge centerline of the final radiating slot, such as 184C, to be ¼ Aλg from the terminal edge 186C may result in a four-space (4d) reflection zone from the plated vias on either side of each radiating slot. FIG. 3D depicts this four-space reflection zone by the item 181, which shows 4d e.g. four equal spaces between holes, from centerline to centerline along the radiating slots.

Similarly, for alternative examples of terminal edges 186A (a row of vias) and 186B (a plated slot), placing final radiating slots 184A and 184B so the long-edge centerline of the final radiating slot is ¼ Aλg (188) from the terminal edge may result in a four-space reflection zone (181) for the radiating slots. The row of vias terminal edge, as shown by 186A may have inaccuracies if the wavelength is not precisely matched to the dimensions. This is because the equivalent distance from the center of the last slot to the "edge" for a row of vias is actually smaller than ¼ λg. At millimeter-wave frequency band, this may cause undesirable results. In some examples a plated slot (186B) or edge plating (186C) may have advantages over the row of vias shown in 186A. An SIW slot waveguide antenna according to the techniques of this disclosure may have advantages for consistent and reliable SIW design and performance.

Figure 3E:
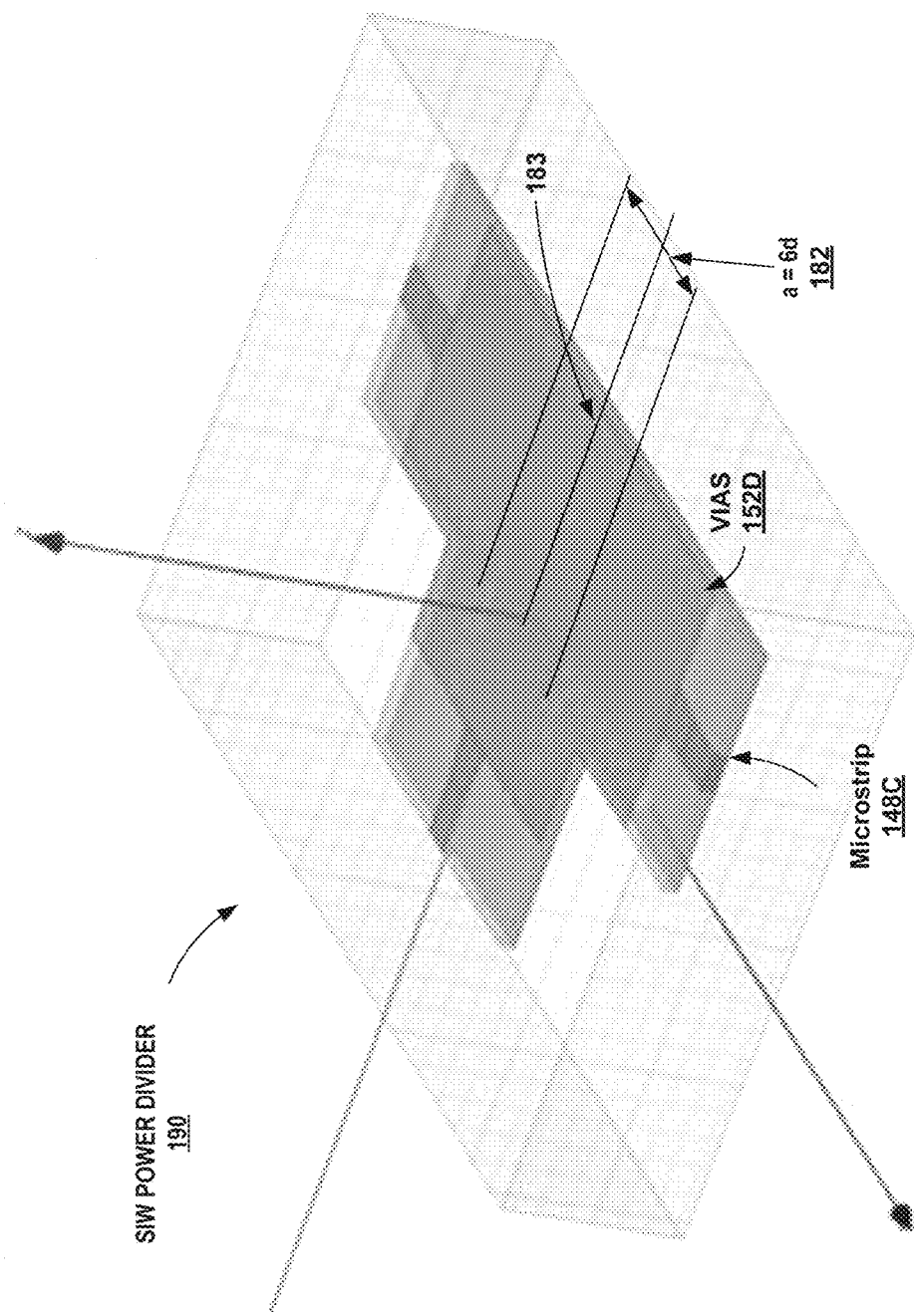
FIG. 3E is a three-dimensional view of an example SIW power divider in accordance with one or more techniques of this disclosure.

FIG. 3E is a three-dimensional view of an example SIW power divider. FIG. 3E depicts example SIW power divider 190, which is configured the same as SIW power divider 190 shown in FIG. 3D. Example, SIW power divider 190 as depicted by FIG. 3E includes vias 152D, an SIW width a=6d (182), which results in a hole 183 in the center of the short edge. FIG. 3E also depicts three microstrip transitions, though for clarity only microstrip transition 148C is labeled. FIG. 3E illustrates a three-dimension view of an example implementation of an SIW power divider. SIW power divider is distinct from power dividers 176 and 176A in that power dividers 176 and 176A may be implemented on a circuit layer of an example multi-layer PCB 101, where SIW power divider 190 may be implemented on an SIW layer.

Figure 3F:
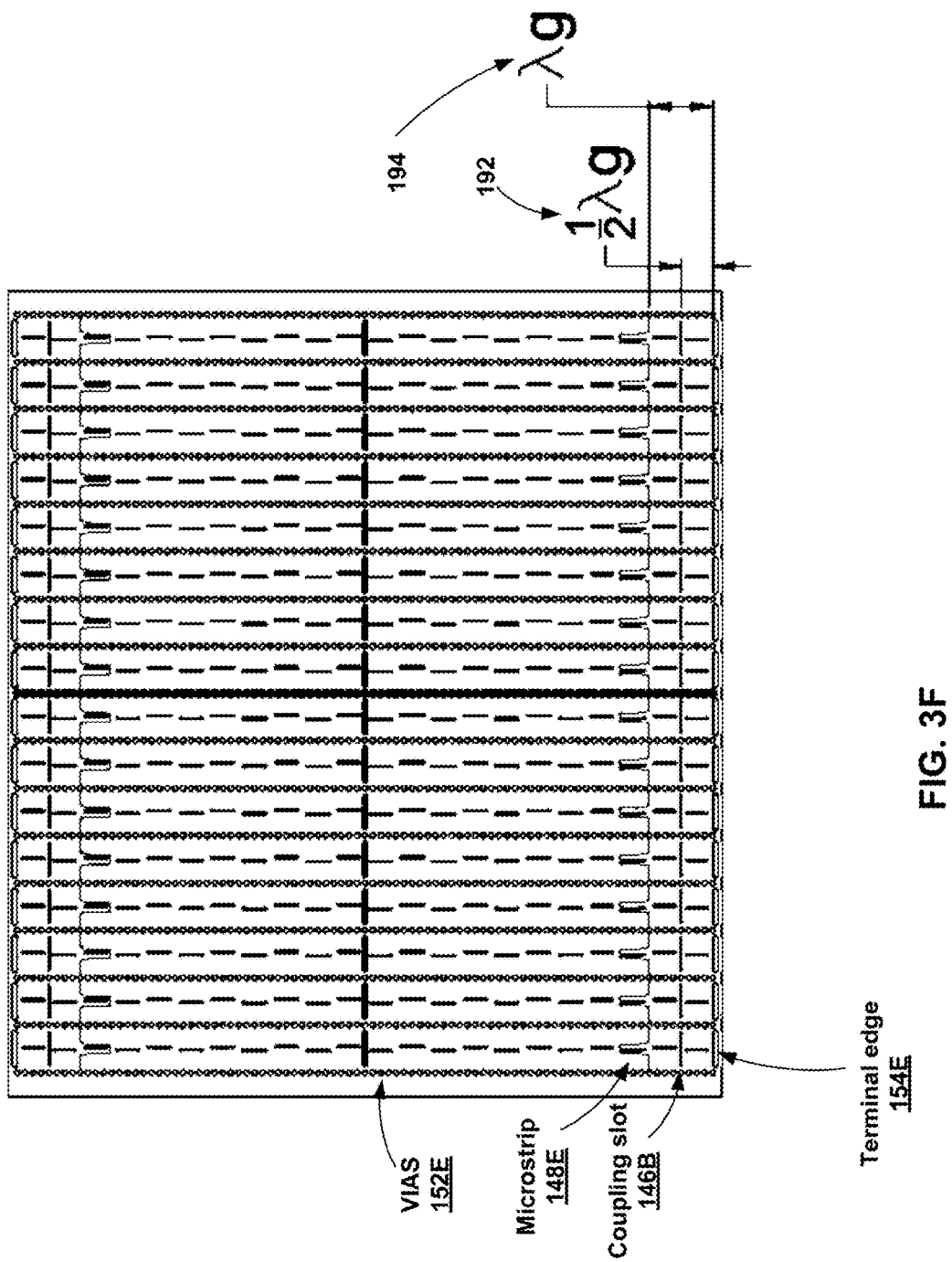
FIG. 3F is a two-dimensional view of an example slot waveguide antenna array system illustrating dimensions for coupling slot and microstrip in accordance with one or more techniques of this disclosure.

FIG. 3F is a two-dimensional view of an example slot waveguide antenna array system illustrating dimensions for a coupling slot and microstrip in accordance with one or more techniques of this disclosure. Each channel may have a coupling slot 146E. The distance between the short-edge centerline of coupling slot 146E to terminal edge 154E may be given according to the equation:

$$D_c = \frac{n}{2}\lambda g (n = 1, 2, 3 \ldots \ldots ToN)$$

The example of FIG. 3F depicts terminal edge 154E as a plated slot. The distance between microstrip transition 148E and terminal edge 154E may be given according to the equation:

$$D_T = \frac{n+1}{2}\lambda g (n = 1, 2, 3 \ldots \ldots ToN)$$

For a digital active phased array, a longer D and $D_T$ suffers higher insert loss than a shorter $D_c$ and $D_T$. However, a larger D and $D_T$ provides additional space to put additional components on other layers. In other words, n>1, provides more space for additional components. The example of FIG. 3F depicts n=1 to minimize insertion loss resulting in $D_c$=/2 and $D_T$=λg. An SIW slot waveguide antenna with coupling slot location and microstrip location according to the techniques of this disclosure may have advantages for consistent and reliable SIW design and performance. The layout and benefit ((2n−1)/N−1 coupling) may balance loss and enough area for the back circuit. As depicted in the example of FIG. 3F, the terminal of each SIW element connects to a ground layer, e.g. ground layer 144, using a single plated slot hole (186B) instead of many vias or holes (186A), as shown in FIG. 3D.

Figure 3G:
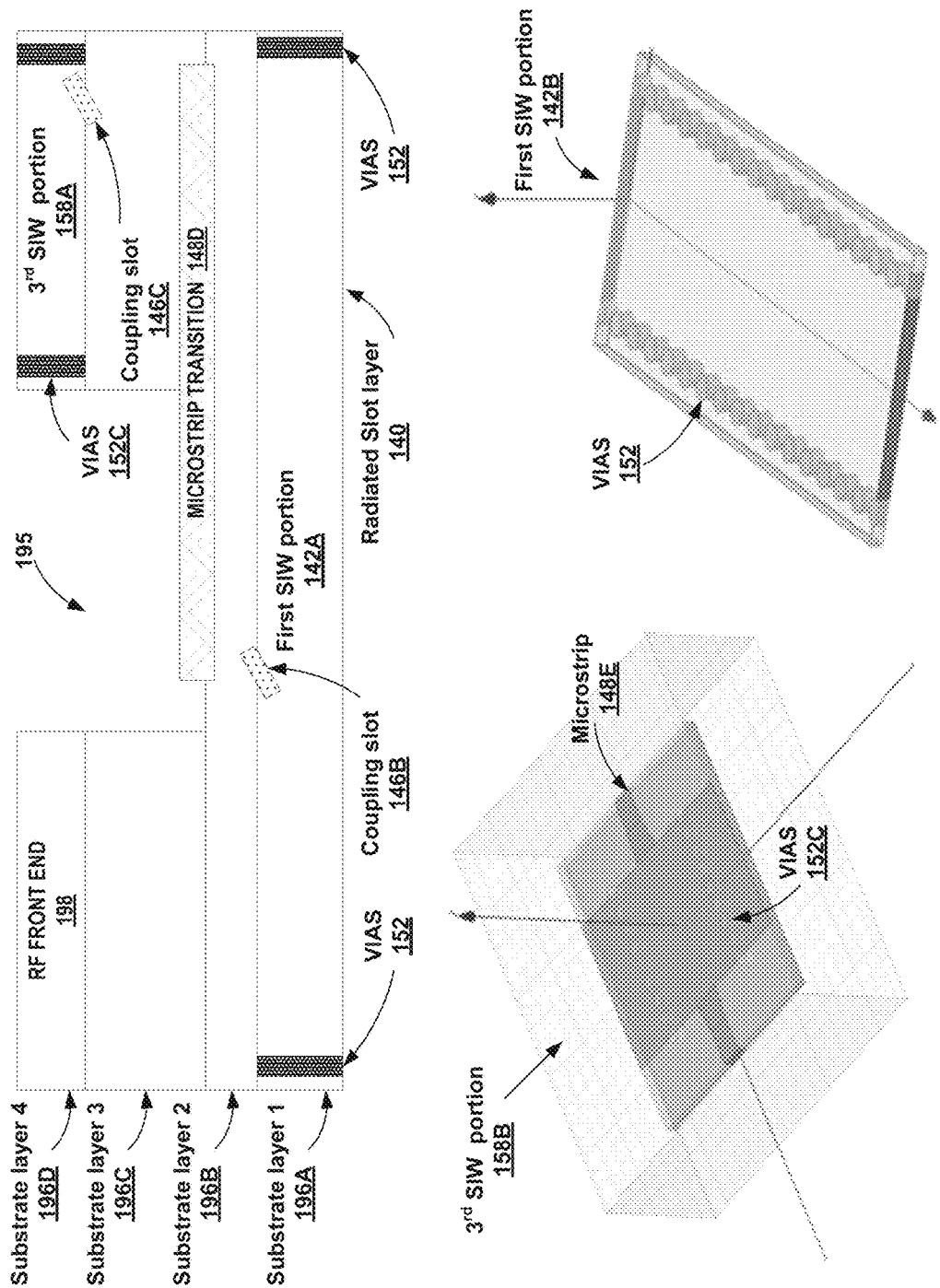
FIG. 3G is a combined three-dimensional view and cross-sectional view of an example multi-layer printed circuit board that may integrate waveguide layers, signal and component layers.

FIG. 3G is a combined three-dimensional view and cross-sectional view of an example multi-layer PCB that may integrate waveguide layers, signal and component layers. FIG. 3G includes example cross-sectional view 195 with three-dimensional views of first SIW portion 142B and third SIW portion 158B. In the example of FIG. 3G, first SIW portion 142B and third SIW portion 158B are configured the same as the example first SIW portion 142 and third SIW portion 158 as shown in FIG. 3B.

Cross section view 195 includes substrate layers 196A-196D and, though not labeled for clarity sake, may also include metal layers described in FIG. 3B, e.g., a slot layer, a ground layer, a signal layer and a second ground layer. The portion of example multi-layer PCB illustrated by cross-section 195 includes RF front end 198, third SIW portion 158A with vias 152C, first SIW portion 142A with vias 152 and radiating slot layer 140. The vias, and radiating slot layer 140, are configured in the example of FIG. 3G the same as in the example of FIG. 3B, and other figures described above. Coupling slot 146B connects first SIW portion 142A to substrate layer 2 (196B). In some examples, multi-layer PCB 101 may include additional coupling slots between other layers. Microstrip transition 148D and 148E provide a connection between the SIW and the signal layer and function the same as microstrip transition 148 described above.

Figure 4:
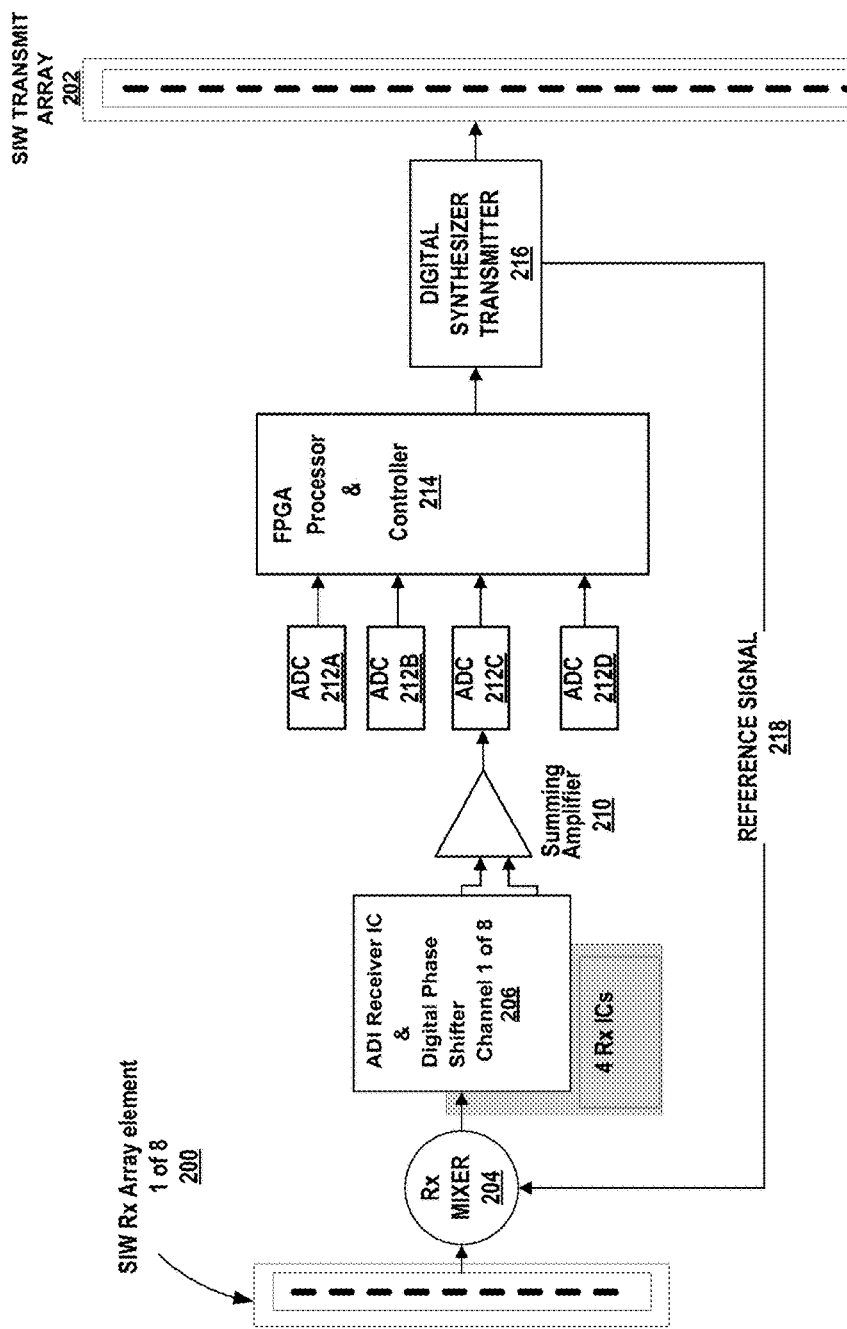
FIG. 4 is a conceptual and schematic block diagram illustrating an example integrated monopulse radar system using a slot waveguide antenna array system in accordance with one or more techniques of this disclosure.

FIG. 4 is a conceptual and schematic block diagram illustrating an example integrated monopulse radar system using a slot waveguide antenna array system in accordance with one or more techniques of this disclosure. FIG. 4 depicts SIW Rx array element 200 and SIW Tx array 202, which function similarly to the SIW Rx array 122 and SIW Tx antenna 126 as shown in FIG. 2B. Rx mixer 204 operates in a manner similar to mixer 164 from FIG. 3B. Reference signal 218 may be a local oscillator (LO) signal that may pass through a similar eight-way divider as shown in FIG. 3B. Receiver IC 206 and ADCs 212A-212D may be similar to the receiver chip 108A-108D and A/D converters 106A-106D shown in FIG. 2A. An example component that may perform some of the features of receiver IC 206 may include the AD9670 Octal Ultrasound Analog Front End (AFE) Receiver, which will be described in further detail below.

Rx mixer 204 may receive inputs from SIW Rx array element 200 and reference signal 218 from digital synthesizer transmitter 216 to down-convert the reflected radar signals received by SIW Rx array element 200. Rx mixer 204 may output the down-converted radar receive signal to a respective receiver integrated circuit (IC) 206 for a respective receive channel. Receiver IC 206 may output the respective signals for the respective receive channel to a respective ADC, such as ADC 212C as shown in the example of FIG. 4.

FPGA processor and controller 214 ("FPGA 214") may receive the digitized signals from the different receive channel ADCs 212A-212C. FPGA 214 may perform the functions of digital receive beam steering, target detection processing and analysis and send target information to the external communication system to be further sent to one or more display devices. For example, FPGA 214 may control the radar transmitter electronics, which are configured to output radar signals in conjunction with the SIW radar transmit array 202. Radar transmitter electronics may include digital synthesizer transmitter 216.

FPGA 214 may also control the radar receiver electronics which may include Rx mixer 204, the four receiver integrated circuits (IC) 206, summing amplifier 210 and ADCs 212A-212D. The radar receive electronics may include digital beam forming circuitry configured to receive radar reflections corresponding to the outputted radar signals, and to send signals associated with the radar reflections to FPGA 214. SIW Rx array element 200, acts as a radar receive antenna to collect radar reflections impinging on the surface of its slot layer. SIW Rx array element 200 may be a single SIW antenna device 130 in a subarray 132A within the SIW Rx array 122, as depicted in FIG. 2B. The terms radar receive electronics and radar receiver electronics may be used interchangeably in this disclosure.

FPGA 214 and digital synthesizer transmitter 216 may include circuitry that converts received radar signals to a lower frequency for further processing. Further processing may include beam steering, target detection and location as well as other functions. Other types of functions performed by FPGA 214 and digital synthesizer transmitter 216 may include in-phase and quadrature processing (I and Q), filtering, frequency, phase and amplitude control, modulation, direct digital synthesis (DDS) and other functions. The digital beam forming may include heterodyne processing. The digital beam forming circuitry may be configured to operate in the ultrasonic frequency range.

Figure 5A:
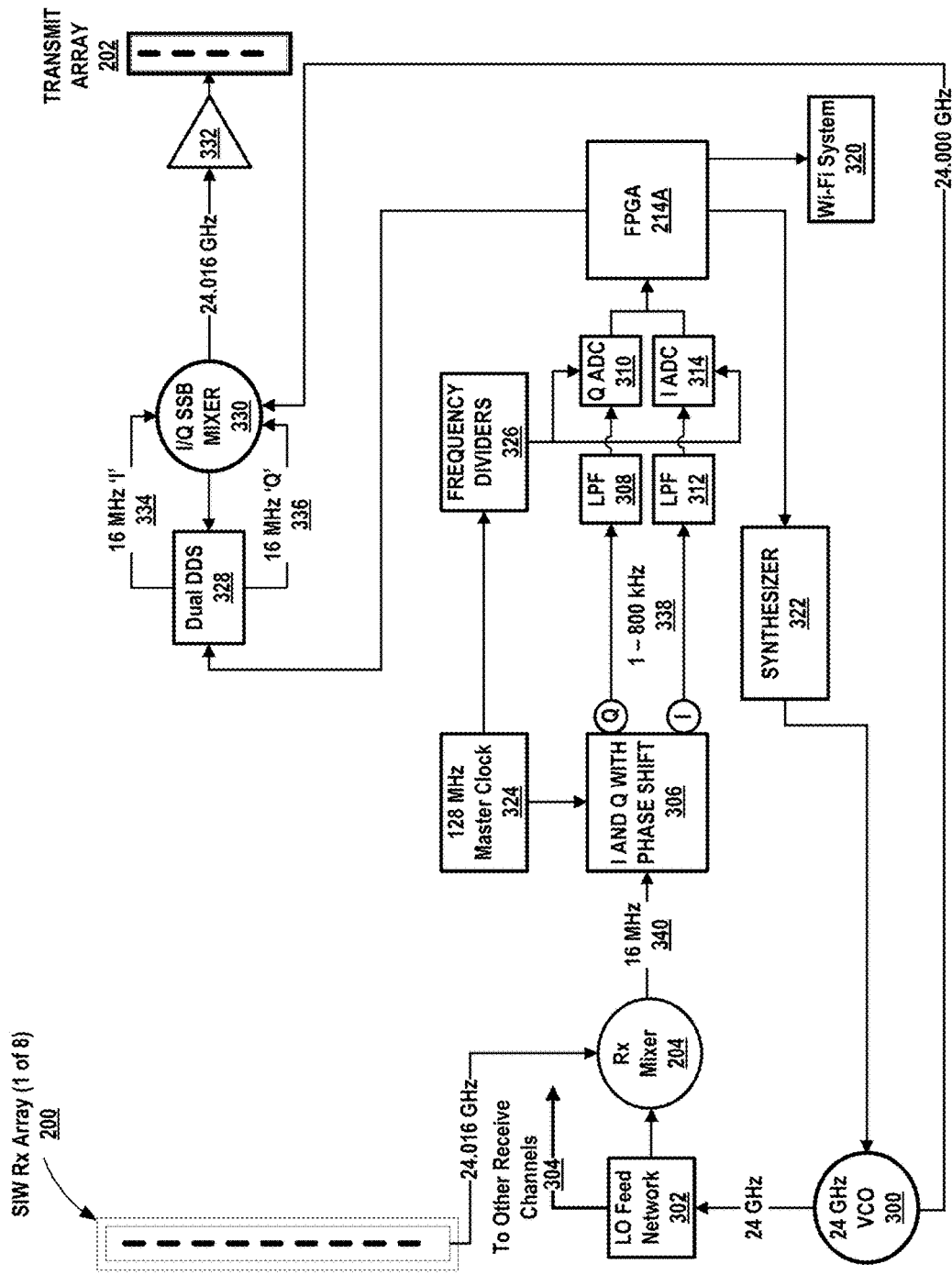
FIG. 5A is a conceptual and schematic block diagram of an example radar receive channel and radar transmitter electronics that may be used in an obstacle collision avoidance system.

FIG. 5A is a conceptual and schematic block diagram of an example radar receive channel and radar transmitter electronics that may be used in an obstacle collision avoidance system. The example diagram of FIG. 5A depicts a single receive channel and an example implementation of superheterodyne up and down converting from RF frequencies to other frequencies. Other receive channels that may be part of a collision avoidance system are not shown in FIG. 5A for clarity.

FIG. 5A includes additional details of portions of integrated radar system 100 using a slot waveguide antenna array shown in FIG. 4. FIG. 5A may include SIW Rx array element 200, SIW Tx array 202 and Rx mixer 204 as shown in FIG. 4. Addition components shown in FIG. 5A may be included in FPGA processor and controller 214, digital synthesizer transmitter 216 and Receiver IC 206. FIG. 5A depicts VCO 300, local oscillator (LO) feed network 302 and other receive channels 304, along with in-phase and quadrature (I and Q) unit 306, low pass filters (LPF) 308 and 312 and analog to digital converters 310 and 314. Other radar electronics may include FPGA 214A, synthesizer 322, 128 MHz master clock 324, frequency dividers 326, dual digital direct synthesis (DDS) unit 328, I/Q single side band (SSB) mixer 330, and amplifier 332. Also Wi-Fi system 320, which may receive information from FPGA 214A.

The radar receiver electronics depicted in FIG. 5A downconvert received radar signal from SIW Rx array element 200 to an intermediate frequency (IF) 16 MHz (340) and to lower frequencies for further processing, which may include receive beam steering. The radar transmitter electronics may transmit RF energy with a wide azimuth and narrow elevation through transmit (Tx) array 202.

VCO 300, as shown in the example of FIG. 5A, generates a 24 GHz signal which is distributed to the LO feed network 302 and further to Rx mixer 204. LO feed network 302 may function, for example, as an eight-way power divider 176 or two-way power divider 176A as shown in FIGS. 3B and 3C. VCO 300 also distributes 24 GHz to I/Q SSB mixer 330. VCO 300 may receive input from synthesizer 322. 24 GHZ is shown as one example. In other examples VCO 300 may generate other frequencies, such as 13 GHz.

LO Feed network 302 may output the 24.0 GHz LO signal to other receive channels 304 as well as Rx mixer 204, which functions the same as Rx mixer 204 shown in FIG. 4. In the example of FIG. 5A, Rx mixer 204 converts the 24.016 GHz reflected radar signal from SIW Rx array element 200 to an intermediate frequency (IF) of 16 MHz (340). These frequency values are only for illustration. Integrated radar system 100 may also use other frequencies. Rx mixer 204 may output the IF of 16 MHz (340) to I and Q unit 306.

Synthesizer 322 may utilize a method of changing the division ratio within a digital PLL synthesizer to provide frequencies that are not integral multiples of the comparison frequency. A divider may take a fractional division ratio rather than an integer ratio by alternating between division ratios. One example may include a fractional N synthesizer that uses the basic digital PLL loop. Analog Devices component ADF4159, a direct modulation fractional-N frequency synthesizer, is one example of a fractional N synthesizer. However, in some examples fractional N synthesizers may generate spurious signals that appear as false targets in the receiver. Other example of synthesizer 322 may include a direct digital synthesizer that may have advantages over a fractional N synthesizer.

Frequency synthesis may use various forms of Direct Digital Synthesizer, Phase Lock Loop, frequency multiplier and other methods. Synthesizer 322 will generate a linear FMCW waveform and may receive control and other inputs from FPGA 214A.

I and Q unit 306 may include a phase shift function along with the in-phase and quadrature function. A monopulse radar may need to get information both from the real and imaginary portions of the returned radar signal. I and Q unit 306 may provide a representation of the returned radar signal at the intermediate frequency (IF) of 16 MHz, as shown in FIG. 5A. These frequencies listed in FIG. 5A are just for illustration. Other frequencies may also be used. The quadrature down conversion may divide the 128 MHz oscillator signal by eight, e.g. 8×16 MHz=128 MHz. Terms for 128 MHz master clock 324 may include reference oscillator, 128 MHz oscillator and 128 MHz clock. These terms may be used interchangeably in this disclosure.

I and Q unit 306 may perform two functions simultaneously. First, I and Q unit 306 may divide 128 MHz clock signal 324 by eight and provide a four-bit phase shift with digital control. At the same time as the four-bit phase shift, I and Q unit 306 may form the in-phase (I) and quadrature (Q) signal portions and downconvert the 16 MHz IF frequency to a base band between 1 kHz and 2 kHz. The I and Q signal portions may also be called the "I" channel and "Q" channel. The output signal from I and Q unit 306 passes through LPF 308 and 312 and ADCs 310 and 314 may digitize each portion of the returned signal. ADCs 310 and 314 may receive input from frequency dividers 326. Both frequency dividers 326 and I and Q unit 306 may receive a 128 MHz clock signal from 128 MHz master clock 324. Frequency dividers 326 may output a signal to ADCs 310 and 314.

FPGA 214A may receive the separate I and Q signals from each receiver channel. FPGA 214A may combine and process the signals, including digital receive beam steering to determine the 3D position of obstacles within the radar coverage area, as shown in FIG. 1A. FPGA 214A may process obstacle information, including size, height, rate of closure and other information and send to Wi-Fi system 320. Wi-Fi system 320 may further send obstacle information of one or more display devices. One possible example of FPGA 214A may include the Xilinx XC7k70t 7-series FPGA.

Radar transmitter electronics may include dual DDS 328 and I/Q SSB mixer 330. Dual DDS 328 may receive commands and control inputs from FPGA 214A and output a 16 MHz intermediate frequency I signal 334 and Q signal 336 to I/Q SSB mixer 330. An example dual DDS may include the Analog Devices AD9958.

I/Q SSB mixer 330 may receive the signals from dual DDS 328, as well as a 24 GHz signal from VCO 300. I/Q SSB mixer 330 may output radar signals to amplifier 332 and further to SIW transmit array 202. One example of amplifier 332 may include the HMC863 from Analog Devices. SIW transmit array 202 may output the radar signals in the prescribed pattern. Any reflected radar signals may impinge on SIW Rx array element 200 and be conducted to the FPGA for processing.

Figure 5B:
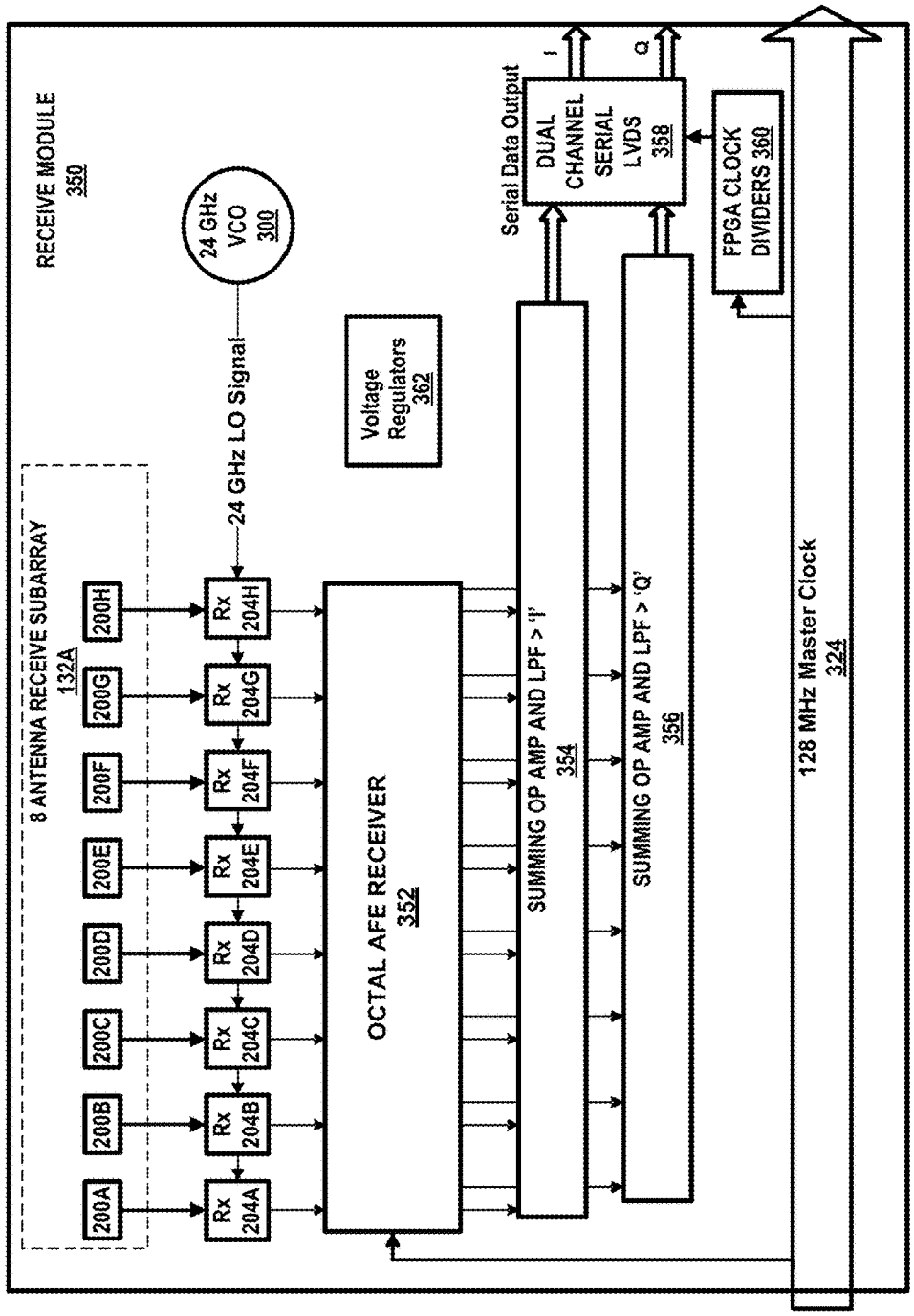
FIG. 5B is a conceptual block diagram of portions of an example receive module illustrating multiple channels that may be part of radar receiver electronics in accordance with one or more techniques of this disclosure.

FIG. 5B is a conceptual block diagram of portions of an example receive module illustrating multiple channels that may be part of radar receive electronics in accordance with one or more techniques of this disclosure. FIG. 5B illustrates example components and techniques to process received radar signals from a portion of SIW receiver array 122 as shown in FIG. 2B. The example of FIG. 5B depicts other details of the functions of FIG. 4 and FIG. 5A that include an example radar receiver subarray 132A, such as that shown in FIG. 2B. A complete, integrated radar system may use one or more sets of the components shown in FIG. 5B. For example, an integrated radar system that uses four radar receiver subarrays may use four sets of components as shown in FIG. 5B to achieve the 32 channels shown in FIG. 2B.

Receive module 350 may include radar receiver antenna subarray 132A, VCO 300, an Rx mixer 204A-204H for each channel, an octal analog front end (AFE) receiver 352, a summing operational amplifier (opamp) and LPF for both in-phase 354 ("I") and quadrature 356 ("Q") signals, a dual channel low voltage differential signaling (LVDS) unit 358, FPGA clock dividers 360 and voltage regulators 362. The components depicted in receive module 350 may be mounted and inter-connected on multi-layer PCB 101 that includes an SIW antenna layer 102 and one or more circuit layers 103, shown in FIG. 2A.

The example of FIG. 5B depicts radar receiver antenna subarray 132A to include eight SIW Rx array elements 200A-200H. In other examples, radar receiver subarray 132A may include more or less than eight SIW Rx array elements. Each SIW Rx array element 200A-200H connects to a respective Rx mixer 204A-204H. Each Rx mixer 204A-204H for each of the eight channels depicted in receive module 350 also receive a 24 GHz LO signal from VCO 300. The Rx mixers down-convert the reflected radar signal received by the SIW Rx array element for each channel and send the input to octal AFE receiver 352. The signal path for each channel may include components other than Rx mixers 204A-204H, as depicted by FIGS. 4, 5A and below in FIG. 5C. The example of FIG. 5B depicts an Rx mixer 204 for each channel. Other examples may use a four-channel mixer rather than a single mixer for each channel. Example four-channel mixer components may include the ADF5904 from Analog Devices. As described above, mixer components may have performance advantages when placed in the middle of the SIW subarrays so that the path lengths between each subarray and the four-channel receiver chip is equal length. For example, this may allow the signal from VCO 300 to arrive at the same time and in the same phase for each receiver channel.

Octal afe receiver 352 may perform a variety of functions for each of the eight channels. Some examples may include preamplification, harmonic rejection, anti-alias filtering, I/Q demodulation and phase rotation, digital demodulation and decimation as well as conversion to digital signals through ADC. One possible example component to perform at least some of the functions of octal afe receiver 352 may include the Analog Devices AD9670 Octal Ultrasound Analog Front End (AFE) Receiver. Octal afe receiver 352 may receive a 128 MHz clock input from 128 MHz master clock 324. Octal afe receiver 352 may output an in-phase "I" signal for each channel to a set of summing opamp and low pass filters for each channel, depicted as a single unit 354 in the example of receive module 350. Similarly, Octal afe receiver 352 may output a quadrature "Q" signal for each channel to a set of summing opamp and low pass filters for each channel, depicted as a single unit 356.

LVDS unit 358 may receive the "I" and "Q" inputs from summing opamp and low pass filters 354 and 356 as well as an input from FPGA clock dividers 360. LVDS unit 358 may operate under the LVDS, or TIA/EIA-644 technical standard to sample the input signals and perform analog-to-digital conversion. Example components that may perform one or more functions of LVDS unit 358 may include Analog Devices AD7357 or AD7356 differential input ADC components. LVDS unit 358 may output the digitized "I" and "Q" signals for further processing, such as beam forming, obstacle identification and other functions as needed by a collision avoidance system, in accordance with one or more techniques of this disclosure.

Receive module 350 may also include voltage regulators 362. Voltage regulators 362 may provide regulated power supplies to the components of receive module 350. For example, LVDS unit 358 may require an input voltage of 2.5V while octal AFE receiver 352 may require an input voltage of 3.0 V. Voltage regulators 362 may supply power for proper operation of each component in receive module 350.

Figure 5C:
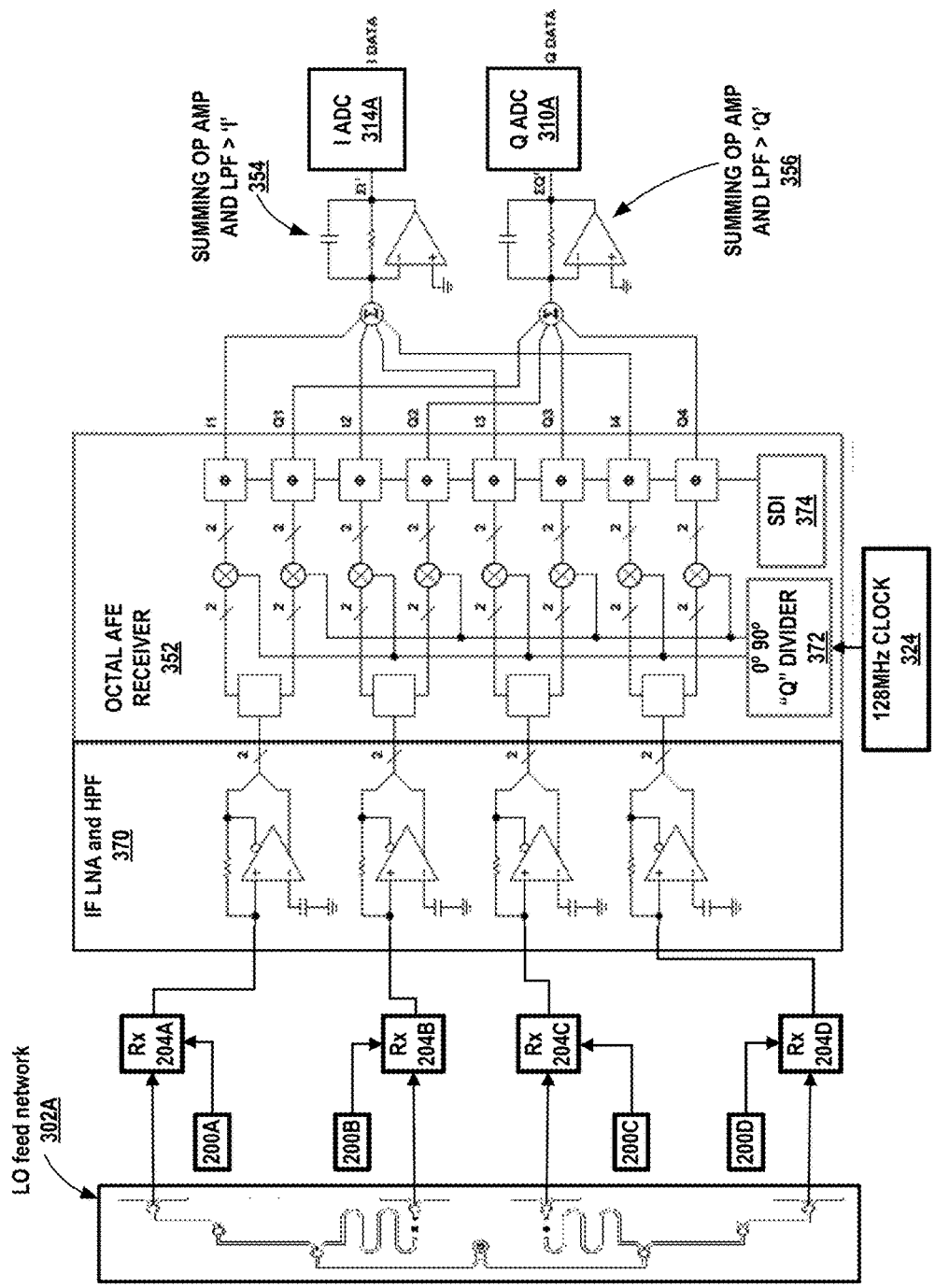
FIG. 5C illustrates some of the additional components that may be included in the radar receiver electronics, which may be mounted and interconnected on multi-layer printed circuit board.

FIG. 5C is a conceptual and schematic diagram depicting additional details of a portion of the radar receive electronics that may be included in an integrated radar system. FIG. 5C depicts four channels of example radar receive electronics for clarity. In the example SIW receiver array 122 as shown in FIG. 2B, the set of electronics depicted in FIG. 5C would be repeated for the total number of channels in the receive array. FIG. 5C retains the same numbers for components where components in FIG. 5C are the same as in other figures. For example, SIW Rx array elements 200A-200D and 128 MHz master clock 324 are the same as those components shown in FIG. 5B.

FIG. 5C illustrates some of the additional components that may be included in the radar receiver electronics, which may be mounted and interconnected on multi-layer PCB 101. FIG. 5C depicts LO feed network 302A, Rx mixers 204A-204D, SIW Rx array elements 200A-200D, intermediate frequency (IF) low-noise amplifier (LNA) and high pass filter (HPF) 370, octal AFE receiver 352, summing opamp and LPF 354 and 356 for the "I" and "Q" signals, "I" ADC 314A and "Q" ADC 310A. Also shown in the example of octal AFE receiver 352 is quadrature divider 372 and serial data in (SDI) controller 374.

LO feed network 302A may deliver a 24 GHz oscillator signal to Rx mixers 204A-204D. LO feed network 302A may receive as input the 24 GHz LO signal from a VCO, such as VCO 300, not shown in FIG. 5C, but shown in 5A. The example of FIG. 5C depicts LO feed network 302A configured so each path length from the local oscillator (LO) is the same length. This may ensure the signal from the LO, such as a VCO, arrives at each Rx mixer 204A-204D at the same time and with the same phase. This is similar to eight-way power divider 176 shown in FIG. 3B.

Rx mixers 204A-204D function the same as described above by receiving and downconverting the reflected radar signals from SIW Rx array elements 200A-200D. Rx mixers 204A-204D output the downconverted signals to the respective channels of IF LNA and HPF 370 (referred to as "LNA 370" for clarity). LNA 370 outputs each channel to a respective channel of octal AFE receiver 352. In the example of an FMCW radar, the high pass filter may set the frequency response of the receiver. A high pass filter is used to set the IF response to have a 40 dB per decade response over a frequency range of about 1 KHz to 2 MHz. This function exactly offsets the propagation losses as a function of range. Octal AFE receiver 352 functions the same as described above. Also depicted in FIG. 5C is quadrature divider 372, which helps with the phase shift function that creates the "Q" output for the monopulse radar receive signals. SDI controller 374 may help manage the data flow to the summing op amps.

Summing opamp and LPF 354 and 356 may act as summing amplifier for the "I" and "Q" signals respectively. Summing opamp and LPF 354 and 356 may combine the signals from the various receive channels for further processing. The LPF portion may remove the upper sideband from the I/Q mixing function.

"I" ADC 341A and "Q" ADC 310A perform the same function for the I and Q ADCs described above. "I" ADC 341A and "Q" ADC 310A digitize the four channels of downconverted and filtered radar receive channels and output the digitized signals for further processing, as described above.

Figure 6:
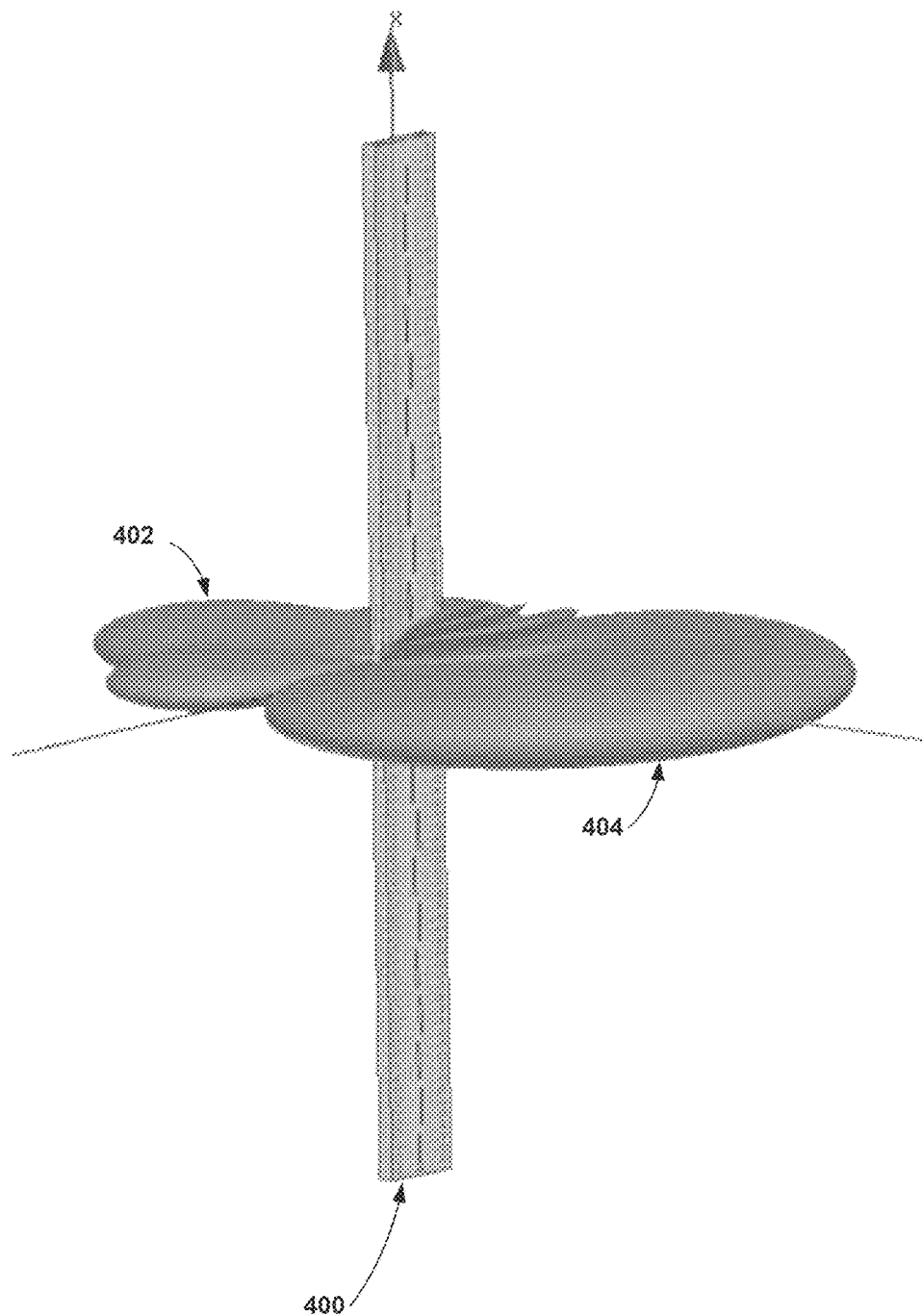
FIG. 6 is a conceptual diagram illustrating an example radar transmission pattern for a collision avoidance system, in accordance with one or more techniques of this disclosure.

FIG. 6 is a conceptual diagram illustrating an example radar transmission pattern for a collision avoidance system, in accordance with one or more techniques of this disclosure. FIG. 6 includes an example transmit antenna 400, a wide azimuth, narrow elevation main transmission beam 404 and sidelobes 402. The radar transmitter electronics, in conjunction with the radar transmit antenna 400, may be configured to output radar signals comprising a transmitted radar beamwidth of less than eight degrees in elevation and at least 65 degrees in azimuth. Radar transmit antenna 400 may function in a similar manner to SIW transmit array 202 shown in FIG. 4 and SIW Tx antenna 126 shown in FIG. 2B. The example SIW transmit pattern may include low elevation sidelobes, which may have the advantages of preventing false alerts and erroneous detections.

Figure 7A:
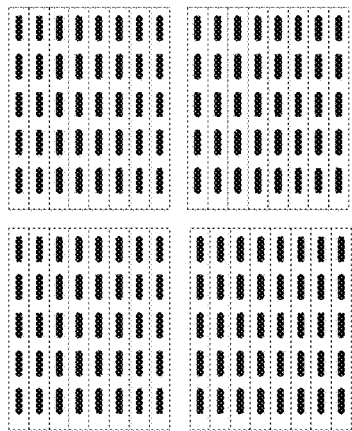
FIGS. 7A-7C are conceptual diagrams illustrating example radar receive pattern for a collision avoidance system, in accordance with one or more techniques of this disclosure.
Figure 7B:
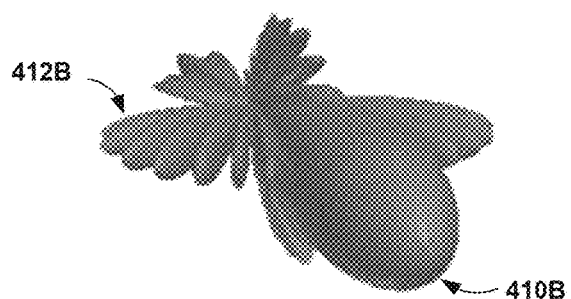
Figure 7C:
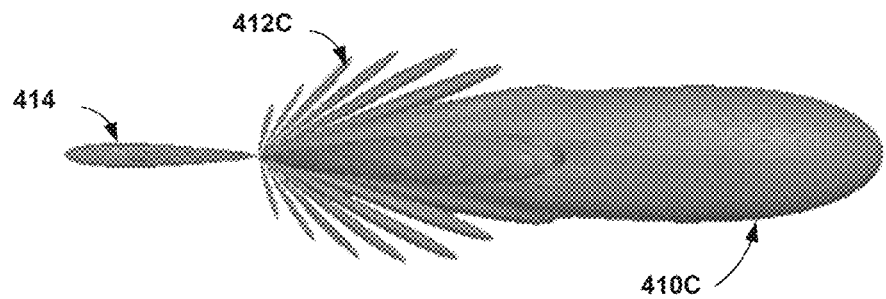

FIGS. 7A-7C are conceptual diagrams illustrating example radar receive pattern for a collision avoidance system, in accordance with one or more techniques of this disclosure. FIG. 7A includes an example slotted waveguide radar receive antenna 122A, which is similar to the SIW Rx array 122 shown in FIG. 2B. FIG. 7B depicts an example receive radar pattern with main receive lobe 410B and side lobes 412B. FIG. 7C depicts a side view of an example radar receive pattern including main lobe 410C, side lobes 412C and rear lobe 414. The beam steering radar receive pattern may include a target detection radar imaging resolution of at least three square meters at a range of 100 meters. The receive pattern may include a radar range resolution of at least 1 meter and radar angular resolution is no more than one and one-half degrees in azimuth and elevation.

Figure 8:
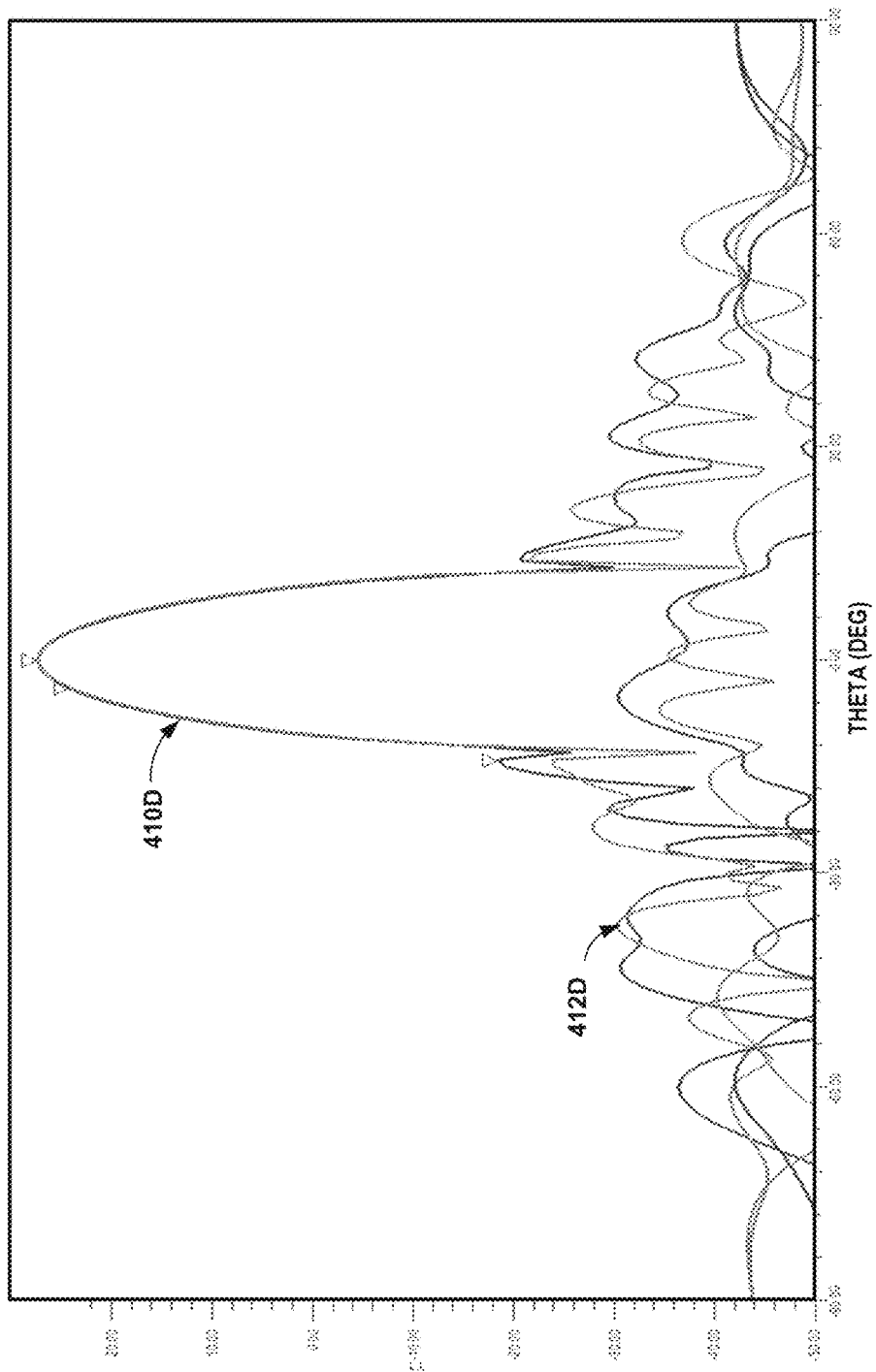
FIG. 8 is a graph illustrating an example radar receive pattern for a collision avoidance system, in accordance with one or more techniques of this disclosure.

FIG. 8 is a graph illustrating an example radar receive pattern for a collision avoidance system, in accordance with one or more techniques of this disclosure. The graph of FIG. 8 depicts a radar receive pattern similar to the patterns shown in FIGS. 7B-7C. FIG. 8 depicts main lobe 410D and side lobes 412D.

Various examples of the disclosure have been described. These and other examples are within the scope of the following claims.

The invention claimed is:
1. A slot waveguide antenna array system comprising:
   a multi-layer circuit board comprising:
      a plurality of substrate integrated waveguide (SIW) elements, wherein each SIW element of the plurality of SIW elements is at least one of a transmitter SIW element or a receiver SIW element and each receiver SIW element defines a receiver channel of the slot waveguide antenna array system;
      at least one signal layer comprising:
         at least one receiver (Rx) mixer element;
         a power divider element, wherein the power divider element connects a local oscillator (LO) signal to the at least one receiver Rx mixer element;
         wherein each receiver SIW element of the plurality of SIW elements connects to an input of the at least one Rx mixer element; and
      at least one circuit layer comprising:
         a plurality of hardware components;
         a plurality of communication paths, wherein at least one communication path connects an output of the receiver Rx mixer element to at least one of the plurality of hardware components.
2. The slot waveguide antenna system of claim 1, wherein at least one of the transmitter SIW elements of the plurality of SIW elements comprises a slot waveguide radar transmitter antenna.
3. The slot waveguide antenna system of claim 1, wherein at least one of the SIW elements of the plurality of SIW elements comprises a slot waveguide radar receiver antenna.
4. The slot waveguide antenna system of claim 1, wherein an SIW element of the plurality of SIW elements comprises a plurality of SIW layers and wherein a first SIW layer of the plurality of SIW layers is configured to stack substantially vertically on a second SIW layer of the plurality of SIW layers.
5. The slot waveguide antenna system of claim 1, wherein the power divider element is implemented on a metal layer of the multi-layer circuit board.

\* \* \* \* \*